US011159379B2

(12) United States Patent
Li et al.

(10) Patent No.: US 11,159,379 B2
(45) Date of Patent: Oct. 26, 2021

(54) ENHANCED 6LOWPAN NEIGHBOR DISCOVERY FOR SUPPORTING MOBILITY AND MULTIPLE BORDER ROUTERS

(71) Applicant: CONVIDA WIRELESS, LLC, Wilmington, DE (US)

(72) Inventors: Hongkun Li, Malvern, PA (US); Chonggang Wang, Princeton, NJ (US); Quang Ly, North Wales, PA (US); Zhuo Chen, Claymont, DE (US); Rocco Di Girolamo, Laval (CA); Xu Li, Plainsboro, NJ (US); Vinod Kumar Choyi, Conshohocken, PA (US); Shamim Akbar Rahman, Cote St. Luc (CA)

(73) Assignee: Convida Wireless, LLC, Wilmington, DE (US)

( * ) Notice: Subject to any disclaimer, the term of this patent is extended or adjusted under 35 U.S.C. 154(b) by 163 days.

(21) Appl. No.: 16/092,237

(22) PCT Filed: Apr. 14, 2017

(86) PCT No.: PCT/US2017/027612
§ 371 (c)(1),
(2) Date: Oct. 9, 2018

(87) PCT Pub. No.: WO2017/180999
PCT Pub. Date: Oct. 19, 2017

(65) Prior Publication Data
US 2021/0021474 A1 Jan. 21, 2021

Related U.S. Application Data

(60) Provisional application No. 62/323,079, filed on Apr. 15, 2016.

(51) Int. Cl.
*H04L 12/24* (2006.01)
*H04L 29/12* (2006.01)

(52) U.S. Cl.
CPC .......... *H04L 41/12* (2013.01); *H04L 61/2007* (2013.01); *H04L 61/6059* (2013.01)

(58) Field of Classification Search
CPC .. H04L 41/12; H04L 61/2007; H04L 61/6059
See application file for complete search history.

(56) References Cited

U.S. PATENT DOCUMENTS 7,483,962 B2 * 1/2009 Lim .................. H04L 29/06
709/220
8,315,218 B2 * 11/2012 Kim .................. H04W 36/385
370/329

(Continued)

FOREIGN PATENT DOCUMENTS

CN 104219143 A * 12/2014
CN 104219239 A * 12/2014

(Continued)

OTHER PUBLICATIONS

Deering, ICMP Router Discovery Messages, Sep. 1991, Request for Comment (RFC) 1256 (Year: 1991).*

(Continued)

*Primary Examiner* — Eric Nowlin
(74) *Attorney, Agent, or Firm* — BakerHostetler

(57) ABSTRACT

The application describes a computer-implemented apparatus that includes a non-transitory memory having instructions stored thereon for assigning address space in a network. The apparatus also includes a processor, operably coupled to the non-transitory memory, configured to execute at least the instruction of receiving a solicitation from a router in the network. The processor is also configured to execute the instruction of replying to the solicitation with address space. The processor is also configured to execute (Continued)

the instruction of receiving a second solicitation from the router to register a new address. The processor is further configured to execute the instruction of determining if the new address is from a dedicated address space or a shared address space. The processor is even further configured to execute the instruction of sending a neighbor advertisement with the address registration to the router.

10 Claims, 18 Drawing Sheets

(56) References Cited

U.S. PATENT DOCUMENTS

| | | | | |
|---|---|---|---|---|
| 8,315,219 B2* | 11/2012 | Kim | H04W 8/06 370/329 |
| 8,601,271 B2* | 12/2013 | Perez | G06F 1/3209 713/175 |
| 8,724,583 B2* | 5/2014 | Gundavelli | H04W 8/005 370/331 |
| 8,774,053 B2* | 7/2014 | Pan | H04L 67/12 370/254 |
| 8,861,489 B2* | 10/2014 | Nam | H04W 40/246 370/338 |
| 10,050,932 B2* | 8/2018 | Zhao | H04L 61/2007 |
| 10,250,497 B1* | 4/2019 | Jose | H04L 69/324 |
| 10,813,032 B2* | 10/2020 | Singh | H04W 40/248 |
| 10,965,637 B1* | 3/2021 | Nayak | H04L 61/2007 |
| 2002/0031135 A1* | 3/2002 | Inoue | H04L 29/12273 370/401 |
| 2004/0030769 A1* | 2/2004 | Lim | H04L 29/12264 709/223 |
| 2004/0081122 A1* | 4/2004 | Koodli | H04W 36/0016 370/329 |
| 2004/0240474 A1* | 12/2004 | Fan | H04L 29/1232 370/475 |
| 2005/0175007 A1* | 8/2005 | Park | H04L 29/12264 370/390 |
| 2006/0140164 A1* | 6/2006 | Patel | H04L 61/2015 370/338 |
| 2007/0153810 A1* | 7/2007 | Jang | H04W 40/246 370/395.53 |
| 2007/0275726 A1* | 11/2007 | Lee | H04W 36/0016 455/436 |
| 2007/0286094 A1* | 12/2007 | Wigglesworth | H04L 41/0803 370/254 |
| 2008/0013538 A1* | 1/2008 | Lee | H04W 40/246 370/390 |
| 2008/0025253 A1* | 1/2008 | Choi | H04L 61/6059 370/328 |
| 2008/0031189 A1* | 2/2008 | Choi | H04W 8/26 370/329 |
| 2008/0031278 A1* | 2/2008 | Jang | H04J 3/24 370/475 |
| 2008/0310323 A1* | 12/2008 | Shirota | H04L 29/12301 370/254 |
| 2009/0185538 A1* | 7/2009 | Choi | H04W 8/02 370/331 |
| 2010/0202355 A1* | 8/2010 | Kim | H04W 36/385 370/328 |
| 2010/0316019 A1* | 12/2010 | Liu | H04L 29/12264 370/331 |
| 2010/0322420 A1* | 12/2010 | Al-Banna | H04L 61/2092 380/255 |
| 2011/0106947 A1* | 5/2011 | Lin | H04L 29/12915 709/225 |
| 2011/0182293 A1* | 7/2011 | Seo | H04L 41/12 370/392 |
| 2011/0317673 A1* | 12/2011 | Shelby | H04W 4/70 370/338 |
| 2012/0084568 A1* | 4/2012 | Sarikaya | H04L 9/3066 713/176 |
| 2012/0099539 A1* | 4/2012 | Kim | H04W 8/26 370/329 |
| 2012/0144483 A1* | 6/2012 | Song | H04L 61/103 726/22 |
| 2012/0224576 A1* | 9/2012 | Gu | H04L 61/6059 370/390 |
| 2012/0324063 A1* | 12/2012 | Wang | H04L 41/0886 709/220 |
| 2013/0007233 A1* | 1/2013 | Lv | H04L 61/2038 709/222 |
| 2013/0086384 A1* | 4/2013 | Perez | G06F 1/3209 713/175 |
| 2013/0191463 A1* | 7/2013 | Thubert | H04L 61/6059 709/206 |
| 2013/0201874 A1* | 8/2013 | Chen | H04L 61/6059 370/255 |
| 2014/0095733 A1* | 4/2014 | Liu | H04L 41/0806 709/245 |
| 2014/0167979 A1* | 6/2014 | Soma | H04L 61/2015 340/870.02 |
| 2014/0301378 A1* | 10/2014 | Xu | H04L 41/12 370/338 |
| 2015/0029916 A1* | 1/2015 | Vukadinovic | H04W 52/0216 370/311 |
| 2015/0295884 A1* | 10/2015 | Zhao | H04L 61/2046 709/245 |
| 2015/0304277 A1* | 10/2015 | Zhao | H04L 61/2007 709/245 |
| 2016/0036768 A1* | 2/2016 | Pratapa | H04W 76/19 709/245 |
| 2016/0309524 A1* | 10/2016 | Barreto De Miranda Sargento | H04W 76/10 |
| 2017/0093855 A1* | 3/2017 | Perez | H04L 61/6004 |
| 2017/0156165 A1* | 6/2017 | Krishnan | H04L 69/16 |
| 2017/0289273 A1* | 10/2017 | Perez | H04L 61/2092 |
| 2018/0124551 A1* | 5/2018 | Savolainen | H04W 76/10 |
| 2019/0044911 A1* | 2/2019 | Matsumoto | H04L 61/6059 |
| 2020/0154339 A1* | 5/2020 | Singh | H04W 40/246 |
| 2020/0213268 A1* | 7/2020 | Nayak | H04L 61/2092 |
| 2020/0213269 A1* | 7/2020 | Nayak | G06F 9/45558 |
| 2021/0014661 A1* | 1/2021 | Jeong | H04W 4/40 |
| 2021/0021474 A1* | 1/2021 | Li | H04L 61/6059 |

FOREIGN PATENT DOCUMENTS

| | | | | |
|---|---|---|---|---|
| CN | 107071906 A | * | 8/2017 | |
| KR | 20100090981 A | * | 8/2010 | H04W 36/385 |
| KR | 101524316 B1 | * | 6/2015 | H04W 36/385 |
| WO | WO-2017121134 A1 | * | 7/2017 | H04L 61/2092 |

OTHER PUBLICATIONS

Thomson et al., IPv6 Stateless Address Autoconfiguralion, Dec. 1998, Request for Comment (RFC) 2462 (Year: 1998).*
Narten et al., Neighbor Discovery for IP Version 6 (IPv6), Dec. 1998, Request for Comment (RFC) 2461 (Year: 1998).*
"Internet Conlrol Message Protocol version 6 (ICMPv6) Parameters", http://www.iana.org/assignments/icmpv6-parameters/icmpv6-parameters.txt, Last updated Jan. 9, 2020, 10 pages.
Chakrabarti et al., 6LoWPAN WG Internet-Draft, "IPv6 LoWPAN Neighbor Discovery and Addressing Choices draft-Chakrabarti-6lowpan-ipv6-nd-simple-00.txt", Mar. 2010, 16 pages.
Conta, et al., Network Working Group RFC: 4443, "Internet Control Message Protocol (ICMPv6) for the Internet Protocol Version 6 (IPv6) Specification", Mar. 2006, 24 pages.
Devarapalli, et al., Network Working Group RFC: 3963, "Network Mobility (NEMO) Basic Support Protocol", Jan. 2005, 33 pages.
Gundavelli, et al., Network Working Group RFC: 5213 "Proxy Mobile IPv6", Aug. 2008, 92 pages.
Hinden, et al., Network Working Group RFC: 4291, "IP Version 6 Addressing Architecture", Feb. 2006, 25 pages.
Hui, et al., Internet Engineering Task Force (IETF) RFC: 6282, Compression Format for IPv6 Datagrams over IEEE 802.15.4-Based Networks, Sep. 2011, 24 pages.

(56) References Cited

OTHER PUBLICATIONS

IEEE Standards Association IEEE Standard for Local and Metropolitan Are Networks—Part 15.4: Low-Rate Wireless Personal Area Networks (LR-WPANs), Sep. 2011, 314 pages.
Kim, et al., Internet Engineering Task Force (IEFT) RFC: 6568, Design and Application Spaces for IPv6 Over Low-Power Wireless Personal Area Networks (6LoWPANs), Apr. 2012, 28 pages.
Kline, et al., Internet Engineering Task Force internet-Draft Updates: 4861 (if approved), "IPv6 Router Advertisement Prefix Information Option Exclusive Bit draft-pioxfols-6man-pio-exclusive-bit-00", Sep. 16, 2016, 13 pages.
Lutchansky, et al., Internet Draft, "IPv6 Router Advertisement Prefix Delegation Option" Feb. 2002, 6 pages.
Montenegro et al., Network Working Group RFC: 4944, "Transmission of IPv6 Packets Over IEEE 802.15.4 Networks", Sep. 2007, 30 pages.
Narten et al., Network Working Group RFC: 4941, "Privacy Extension for Stateless Address Autoconfiguration in IPv6", Sep. 2007, 23 pages.
Perkins, et al., Internet Engineering Task Force (IETF) RFC: 5944 "IP Mobility Support for IPv4, Revised", Nov. 2010, 100 pages.
Perkins, et al., Internet Engineering Task Force (IETF) RFC: 6275, "Mobility Support in IPv6", Jul. 2011, 169 pages.
Shelby, et al., Internet Engineering Task Force (IETF) RFC: 6775, "Neighbor Discovery Optimization for IPv6 Over Low-Power Wireless Personal Area Networks (6LoWPANs)", Nov. 2012, 55 pages.
Winter, et al., Internet Engineering Task Force (IETF) RFC: 6550, "RPL: IPv6 Routing Protocol for Low-Power and Lossy Networks", Mar. 2012, 157 pages.

\* cited by examiner

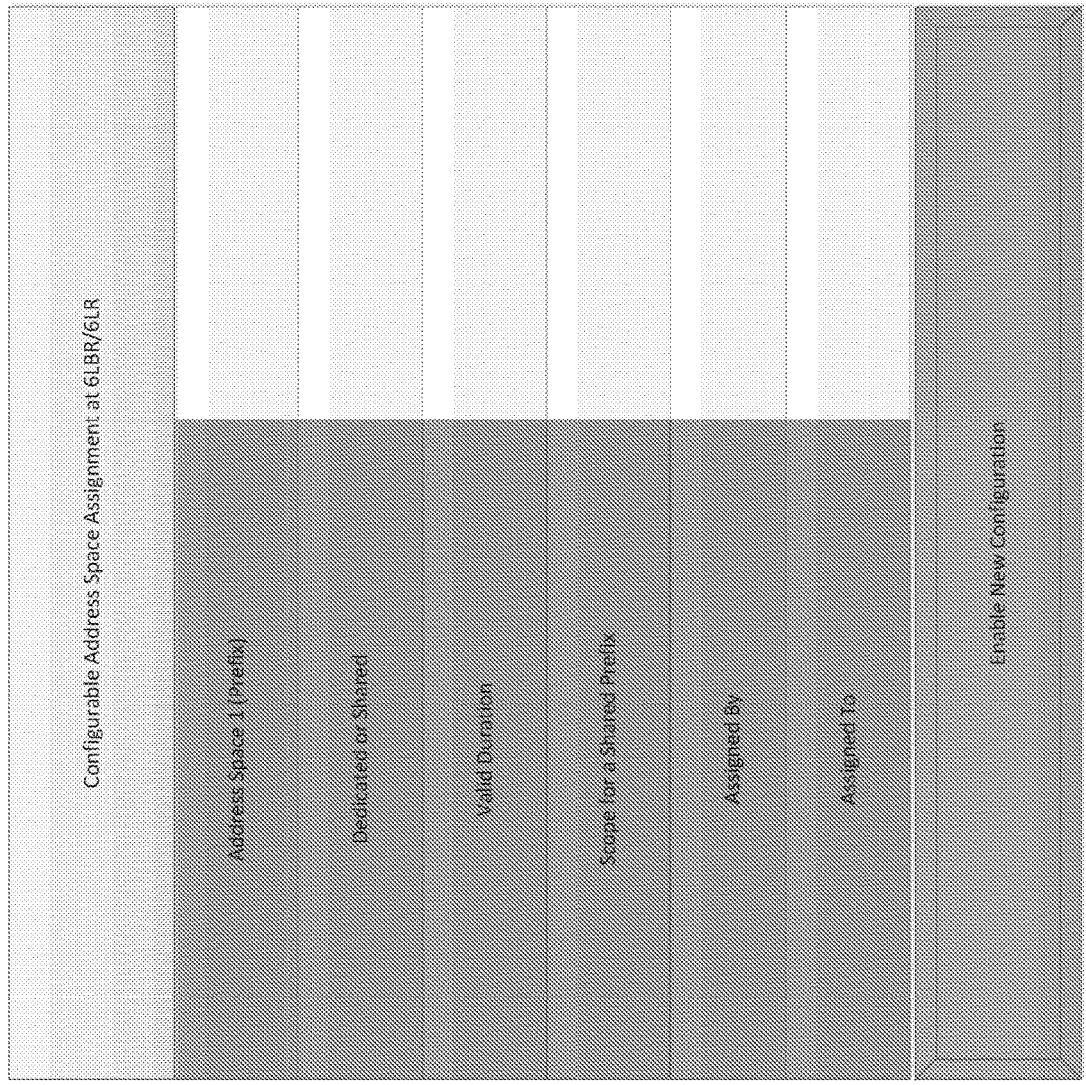

ENHANCED 6LOWPAN NEIGHBOR DISCOVERY FOR SUPPORTING MOBILITY AND MULTIPLE BORDER ROUTERS

CROSS-REFERENCE TO RELATED APPLICATIONS

This application is a National Stage Application filed under 35 U.S.C. 371 of International Application No. PCT/US2017/027612 filed Apr. 14, 2017, which claims the benefit of priority of U.S. Provisional Application No. 62/323,079 filed Apr. 15, 2016, entitled, "Enhanced 6LowPAN Neighbor Discovery for Supporting Mobility and Multiple Border Routers", the contents of which are incorporated by reference in their entireties.

FIELD

The present application is directed to enhanced protocols and systems for decreasing overhead during neighbor discovery over communication networks. In particular, the application is directed to improved neighbor discovery protocols and architecture in large networking systems.

BACKGROUND

In a conventional IPv6 over Wireless Personal Area Network (6LoWPAN), address registration and Duplicate Address Detection (DAD) processes are repeated when a 6LOWPAN node (6LN) moves and attempts to register the same address with different 6LOWPAN Routers (6LRs). That is, the re-registration and DAD processes are generally performed for the same address at different 6LRs. This can particularly be inefficient for large scale 6LoWPANs.

Separately, in existing 6LoWPAN Neighbor Discovery Protocols (NDPs), 6LRs initiate one multi-hop DAD process with each 6LoWPAN Border Router (6LBR) to ensure the registration address is not duplicative in the 6LoWPAN. Moreover, the 6LR initiating the DAD process may not be aware of all 6LBRs in the 6LoWPAN. As a result, a duplicate address will likely be registered given the lack of knowledge of other existing 6LBRs in the Personal Area Network (PAN). Even if the 6LR knows of all 6LBRs in the PAN and sends out a Duplicate Address Request (DAR) to each 6LBR, problems may arise attributed to lack of interaction between 6LBRs.

Current architectures involve a set of devices that move together across multiple 6LoWPANs and stay relatively stationary with respect to each other. Existing protocols require a host to initiate the address registration procedure by sending a Neighbor Solicitation (NS) to a 6LR. This procedure occurs even though the 6LNs remain associated with the same 6LR. Moreover, the 6LNs do not communicate with their associated 6LR because they are unaware of movement into a new 6LoWPAN.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to In one aspect of the application, a computer-implemented apparatus is described that includes a non-transitory memory having instructions stored thereon for registering an address in a network. The apparatus also includes a processor, operably coupled to the non-transitory memory configured to execute the step of receiving a neighbor solicitation from a node in the network. The processor is also configured to execute the step of determining the node has a registered address in the network, and adding the registered address to a neighbor cache of the apparatus. Further, the processor is configured to execute the step of sending a neighbor advertisement to the node including.

In another aspect of the application, a computer-implemented apparatus is described that includes a non-transitory memory having instructions stored thereon for registering an address in a network The apparatus also includes a processor, operably coupled to the non-transitory memory configured to execute the step of sending, via multicast, the address request to plural border routers in the network. The processor is also configured to receive a unicast response from the plural border routers with information regarding uniqueness of the address registration. The processor is further configured to determine the uniqueness of the address registration based upon the received unicast responses from the plural border routers and a duplicate address detection table. Further, the processor is configured to send a unicast response to the router including a status on the uniqueness of the address registration.

In yet another aspect of the application, a computer-implemented apparatus is described that includes a non-transitory memory having instructions stored thereon for registering an address in a network. The apparatus also includes a processor, operably coupled to the non-transitory memory configured to execute the step of receiving a duplicate address request from a router in a network, the request including an address registration of a node in the network. The processor is also configured to execute the step of determining uniqueness of the address registration based upon a check of a duplicate address detection table. The processor is also configured to execute the step of sending a notification to plural border routers in the network of the uniqueness of the address registration of the node.

In yet even another aspect of the application a computer-implemented apparatus is described that includes a non-transitory memory having instructions stored thereon for registering an address of a node in a group in a first network in a second network. The apparatus also includes a processor, operably coupled to the non-transitory memory configured to execute the step of registering with the second network. The processor is also configured to determine the node has moved to the second network using the address and context configured in the first network. The processor is further configured to send an advertisement to the node including configuration information about the second network. The processer is even further configured to execute the step of configuring a new address for the node in the second network based upon a link layer address of the node. The processor also sends a duplicate address request message for the node to a border router in the second network.

In yet even a further aspect of the application a computer-implemented apparatus is described that includes a non-transitory memory having instructions stored thereon for assigning address space in a network. The apparatus also includes a processor, operably coupled to the non-transitory memory configured to execute the step of receiving a solicitation from a router in the network. The processor is also configured to execute the step of replying to the solicitation with address space. The processor is also configured to execute the step of receiving a solicitation from the router to register a new address. Next, the processor determines if the new address is a dedicated address space or a shared address space. Further, the processor executes the step of sending a neighbor advertisement with the address registration to the router.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 15 illustrates a graphical user interface for address space assignment for a border router/router according to an aspect of the application.

DETAILED DESCRIPTION

Figure 1:
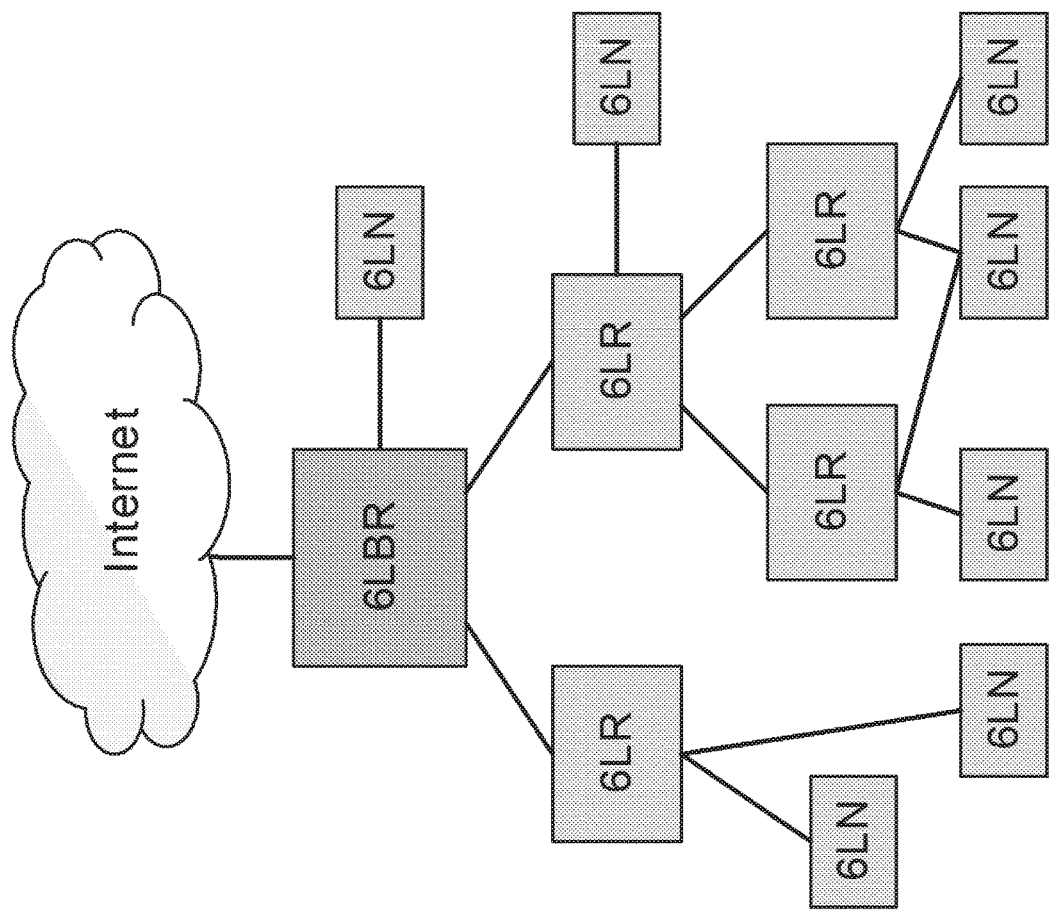
FIG. 1 illustrates an exemplary 6LoWPAN in route-over mode.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Generally, the application is directed to new protocols and systems that minimize overhead attributed to existing address registration and multi-hop DAD processes defined in 6LoWPAN NDP. In one aspect of the application, when a device is moving within a 6LoWPAN, a new procedure is envisaged to indicate whether an address has already been successfully registered for a 6LoWPAN node, or if it is being configured for the first time. For example, if a 6LN sends a NS to register an address indicating that the address has been successfully registered with other 6LR/6LBR through DAD, the receiving 6LR will directly create an entry in its neighbor cache. As a result the 6LR skips the multi-hop DAD. In an embodiment of this aspect, a re-registration process may be employed for an address that has been already registered sometime in the past. In another embodiment of this aspect, protocols are employed to prevent a 6LN from intentionally claiming a new address as an already registered address.

According to another aspect of the application, procedures and architectures are employed for facilitating interaction between 6LBRs in a 6LoWPAN. For instance, the 6LR receiving a NS message initiates only one Duplicate Address Request (DAR) message for DAD. The target 6LBR is responsible for interacting with all other 6LBRs in the same 6LoWPAN for the DAD process. As a result, only one DAD process will be performed.

According to yet another aspect of the application, procedures and architectures are employed whereby address configuration and registration are initiated by a 6LR when it, along with a group of 6LNs, moves across one or more 6LoWPANs. For instance, when the 6LR is moving with associated 6LNs all staying relatively stationary with respect to each other, the 6LR is capable of configuring new addresses for each of the 6LNs in the group. Namely, the 6LR knows the link layer ID of all the 6LNs from a previous configuration. Accordingly, the 6LR is the first to get new prefix and context from the 6LBR of the new 6LoWPAN. As a result, overhead for address registration and DAD is minimized.

According to yet even another aspect of the application, procedures and architectures are employed whereby a distributed address allocation is employed. By contrast with existing 6LoWPAN NDPs having a centralized address allocation, i.e., 6LBR is responsible for allocating all the addresses within the 6LoWPAN by conducting multi-hop DAD, the distributed address allocation assigns each 6LR with a set of dedicated address plus a set of shared addresses that could be registered under its sub-network. Thus, a 6LR can guarantee the uniqueness of an address falling in the set of dedicated addresses. Moreover, the 6LR collaborates with other 6LRs that are also assigned with the same set of shared addresses. As a result, the overhead of address registration and DAD process will be significantly decreased.

Definitions and Acronyms

Table 1 below provides terms/phrases commonly used throughout this application and their accompanying acronym.

TABLE 1

| Acronym | Term or Phrase |
| --- | --- |
| 6CO | 6LoWPAN Context Option |
| 6LBR | 6LoWPAN Border Router |
| 6LN | 6LoWPAN Node |
| 6LO | IPv6 over Networks of Resource-constrained Nodes |
| 6LoWPAN | IPv6 over Wireless Personal Area Networks |
| 6LR | 6LoWAN Router |
| 6MAN | IPv6 Maintenance |
| ABRO | Authoritative Boarder Router Option |
| ARO | Address Registration Option |
| ASO | Address Space Option |
| CoA | Care of Address |
| CID | Context Identifier |
| CN | Correspondent Node |
| CoAP | Constrained Application Protocol |
| DAC | Duplicate Address Confirmation |
| DAD | Duplicate Address Detection |
| DAR | Duplicate Address Request |
| DAS | Dedicated Address Space |
| DMM | Distributed Mobility Management |
| EUI | Extended Unique Identifier |
| FA | Foreign Agent |
| HA | Home Agent |
| HoA | Home Address |
| HTTP | HyperText Transfer Protocol |
| ICMP | Internet Control Message Protocol |
| IETF | Internet Engineering Task Force |
| LMA | Local Mobility Anchor |
| MAC | Medium Access Control |
| MAG | Mobility Access Gateway |
| MIP | Mobile Internet Protocol |
| MN | Mobile Node |
| NA | Neighbor Advertisement |
| NEMO | Network Mobility |
| NCE | Neighbor Cache Entry |
| ND | Neighbor Discovery |
| NDP | Neighbor Discovery Protocol |
| NS | Neighbor Solicitation |
| PMIP | Proxy Mobile IP |
| PIO | Prefix Information Option |
| RA | Router Advertisement |
| RCO | Registration Certificate Option |
| RFC | Request For Comments |
| RPL | IPv6 Routing Protocol for Low-Power and Lossy Networks |
| RS | Router Solicitation |
| SAS | Shared Address Space |
| SCL | Service Capability Layer |
| SLLAO | Source Link Layer Address Option |
| URI | Uniform Resource Identifier |

The following definitions are provided for terms used throughout the application:

6LoWPAN: A network of constrained devices based on IEEE 802.15.4 MAC protocol and IPv6 protocol as specified in IETF RFC 4944. A 6LoWPAN can work in two modes: mesh-under or route-over.

6LBR: A border router located at the junction of separate 6LoWPAN networks or between a 6LoWPAN network and another IP network. There may be one or more 6LBRs at the 6LoWPAN network boundary. A 6LBR is the responsible authority for IPv6 prefix propagation for the 6LoWPAN network it is serving. An isolated 6LoWPAN also contains a 6LBR in the network, which provides the prefix(es) for the isolated network 6LN: Any host or router participating in a 6LoWPAN. A 6LN needs to find its default 6LR in order to join the 6LoWPAN.

6LR: An intermediate router in the 6LoWPAN that is able to send and receive Router Advertisements (RAs) and Router Solicitations (RSs) as well as forward and route IPv6 packets. 6LoWPAN routers are present only in route-over topologies.

NDP: A suite of protocols as specified in for formulating a 6LoWPAN. It contains router discovery, address registration, and router re-direct, etc.

Host: Any node that is not a router

Mesh-Under: A topology where nodes are connected to a 6LBR through a mesh using link-layer forwarding. Thus, in a mesh-under configuration, all IPv6 hosts in a 6LoWPAN are only one IP hop away from the 6LBR. This topology simulates the typical IP-subnet topology with one router with multiple nodes in the same subnet.

NCEs: The records maintained by 6LR and 6LBR about their neighbors. Each entry corresponds to a 6LN or a 6LR. NCE will be leveraged by routing protocols.

NCE in Garbage-collectible Type: Entries that are subject to the normal rules in IETF RFC4861 that allow for garbage collection when low on memory.

NCE in Registered Type: Entries that have an explicit registered lifetime and are kept until this lifetime expires or they are explicitly unregistered.

NCE in Tentative Type: Entries are temporary with a short lifetime, which typically get converted to registered entries.

Address Registration: The process during which a 6LoWPAN node sends a NS message with an ARO to a router 6LR which will create an NCE for the 6LoWPAN node with a specific timeout. Thus, for 6LoWPAN routers, neighbor cache doesn't behave like a cache. Instead, it behaves as a registry of all the host addresses that are attached to the router.

Route-Over: A topology where hosts are connected to the 6LBR through the use of intermediate layer-3 (IP) routing. Here, hosts are typically multiple IP hops away from a 6LBR. The route-over topology typically consists of a 6LBR, a set of 6LRs, and hosts.

For example, the term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

6LoWPAN Overview

FIG. 1 illustrates an example of a route-over 6LoWPAN network including a 6LBR, a few 6LRs, and some 6LNs. A 6LoWPAN network can be deployed to support different applications including but not limited to, industrial monitoring, connected home, healthcare, vehicle telematics, and agricultural monitoring. These applications may differ in their deployment method, network size, power source, connectivity, multi-hop communications, traffic pattern, mobility, security level, and/or quality of service. For example, a 6LoWPAN deployed in roads, vehicles, and traffic signals for vehicle telematics may have the following features including but not limited to: pre-planned deployment, hybrid power source, ad hoc and multi-hop communications, high mobility for vehicles and no mobility for roadside infrastructure.

A deployed 6LoWPAN may include an isolated network. Alternatively, the 6LoWPAN may include a network integrated with the Internet. In an isolated 6LoWPAN, such as a wireless sensor network for smart home, 6LRs and 6LNs can trust each other. In another embodiment, 6LoWPANs may include those deployed for environmental monitoring with remote control from Internet wherein 6LRs and 6LNs dynamically enter and leave.

6LoWPAN Neighbor Discovery

IETF RFC 6775 defines optimized NDP for 6LoWPAN, which mainly include optimized router discovery and address registration. After neighbor discovery is complete, routing protocols such as Routing Protocol for Low-Power and Lossy Networks (RPL) will be used for data transmission. 6LoWPAN NDP deals with packet adaptation, header compression, and neighbor discovery, while routing protocols are responsible for routing an IPv6 packet from/to a constrained device, e.g., 6LN or 6LR.

Router Discovery Process

Figure 2A:
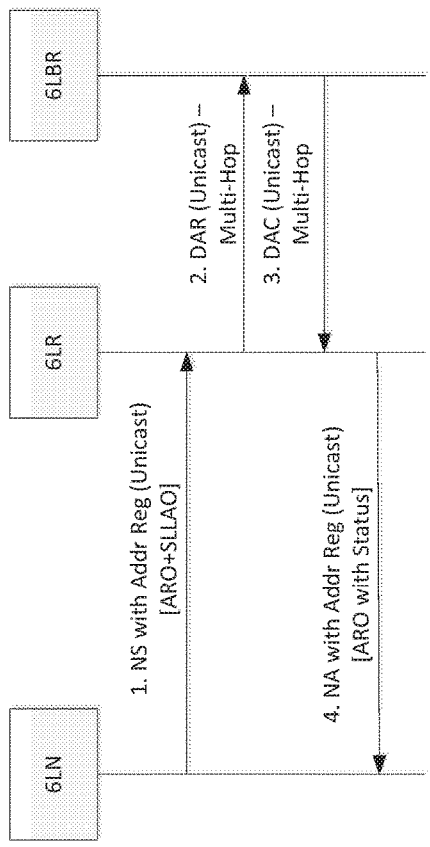
FIG. 2A illustrates a basic router discovery process in a 6LoWPAN neighbor discovery protocol.

FIG. 2A illustrates the router discovery process using RS and RA messages for a 6LN or 6LR to discover its first-hop 6LR or 6LBR. Note that both RS and RA are Internet Control Message Protocol (ICMP) messages with ICMP Type set to 10 and 9 respectively. According to Step 1 in FIG. 2A, a 6LN multicasts a RS message (or unicasts if it knows the address of 6LR) to its neighboring routers. RS message carries 6LN's link layer address in Source Link Layer Address Option (SLLAO). Next, the 6LR receives the RS message and responds with a unicast RA message to the 6LN. RA message contains several options such as Prefix Information Option (PIO) for IPv6 address prefix information, 6LoWPAN Context Option (6CO) for IPv6 header compression context information, SLLAO for 6LR's link layer address, and Authoritative Boarder Router Option (ABRO) for the 6LBR's IPv6 address (Step 2). Subsequently, the 6LR creates a "Tentative" NCE for the 6LN. In this ND process, the 6LR previously performed a similar procedure to find 6LBR and already received options like PIO, 6CO, and ABRO from the 6LBR. In other words, 6LRs use the procedures in FIG. 2A to first discover 6LBR and connect themselves to the 6LoWPAN. After that, 6LRs can be discovered by 6LNs and connect 6LNs to the 6LoWPAN.

According to Step 3, the 6LR may periodically broadcast the RA message. This step is optional. Via the router discovery process, a 6LN can discover a few 6LRs as its first-hop router candidates. The 6LN knows the IPv6 address prefix, which will be used to automatically formulate its own unique IPv6 address within the 6LoWPAN. The 6LN also knows 6LoWPAN header compression context information so that it can appropriately employ 6LoWPAN header compression for future communications with its first-hop routers. The 6LN may choose a 6LR as its first-hop default router based on information obtained in this process. Note that the same procedures in are also used by a 6LR to find 6LBR and other 6LRs to establish multi-hop 6LoWPAN.

Address Registration Process

Figure 2B:
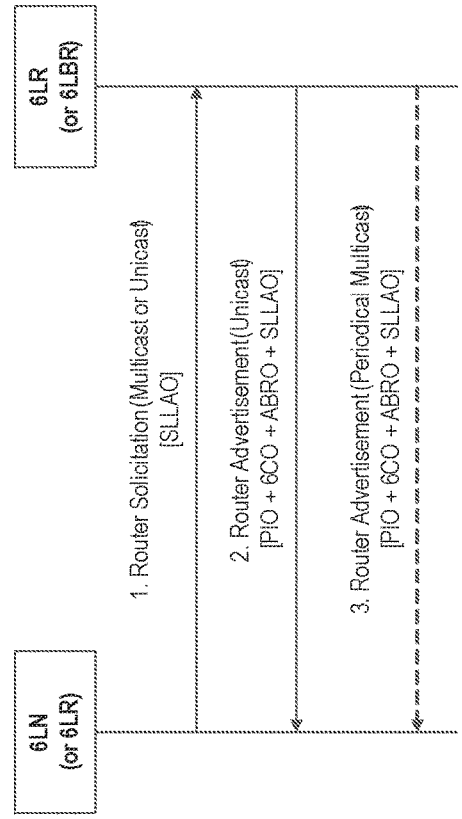
FIG. 2B illustrates a basic address registration process in a 6LoWPAN neighbor discovery protocol.

The address registration process shown in FIG. 2B occurs after the router discovery process and is used by a 6LN to register its IPv6 address for certain amount of time, e.g., registration time, which removes the necessity of periodical RS/RA message exchanges between the 6LN and its 6LR. This feature is quite beneficial for 6LoWPAN to support sleeping nodes. Specifically, the sleeping node could carefully setup the registration time according to its duty cycle, so that it could go to sleep and refresh its registration when it is awake. During address registration, the 6LR may need to perform DAD with the 6LBR, via exchange of DAR and DAC messages, which are ICMP messages with ICMP Type set to 157 and 158 respectively. This guarantees that each 6LN within the 6LoWPAN has a unique and different IPv6 address.

According to Step 1 of FIG. 2B, the 6LN sends NS message to its first-hop default router, i.e., 6LR, which was discovered during router discovery process. The NS message mainly contains the ARO which carries registration time and Extended Unique Identifier (EUI-64) of the 6LN. The registration time in ARO indicates the amount of time that the router should retain the NCE for the 6LN sending the NS. EUI-64 is defined by IEEE as a 64-bit identifier whose limited uses include: a) A 64-bit identifier used to address hardware interfaces within existing IEEE 802 or IEEE 802-like networking applications; b) A 64-bit identifier of a specific hardware instance that is not necessarily a network address; c) A 64-bit identifier used to identify a design instance, as opposed to a hardware instance, e.g., a model number).

According to Step 2 of FIG. 2B, the 6LR sends DAR message to 6LBR which could be multiple hops away from 6LR. The DAR message contains IPv6 address of 6LN, registration time, and the EUI-64 address as carried in the ARO. In an embodiment, a DAR message with registration time set to zero means address de-registration.

According to Step 3 of FIG. 2B, the 6LBR maintains a centralized database of IPv6 addresses of all registered 6LNs. It checks the registering address of 6LN against the database to arbitrate if the new address is a duplicate one. It sends DAC messages back to 6LR. 6LBR uses DAC to inform the 6LR about the registration status including but not limited to: Success, Duplicate Address, and Neighbor Cache Full.

According to Step 4 of FIG. 2B, the 6LR sends NA message to 6LN to inform it about the registration status (included in the DAC message). After this step, 6LR will create a "Registered" NCE for 6LN or change a previously created "Tentative" NCE during the router discovery process to "Registered" NCE. Step 2 and Step 3 are performed along multiple hops between 6LR and 6LBR and are optional. Both NS and NA are ICMP messages with ICMP Type set to 135 and 136, respectively.

According to the "Status" value in ARO included in a NA message, the registration could fail due to reasons that the IPv6 address is already used by another 6LN with a different EUI-64 (Status value is 1), or that the neighbor cache on 6LR/6LBR is full (Status value is 2). The first reason is related to the support for using non-EUI-64-based addresses, such as temporary IPv6 addresses in RFC4941 or addresses based on an Interface Identifier that is an IEEE 802.15.4 16-bit short address. As such, 6LNs may formulate the same IPv6 address and this is the reason that IETF RFC 6775 specifies DAD. Status value with 0 implies that the address is successfully registered, and can be uniquely used by the 6LN. In a NS message, status in ARO must be set to 0, otherwise, the NS message will be ignored by the 6LR.

Mobility Support in IP Layer

Figure 3:
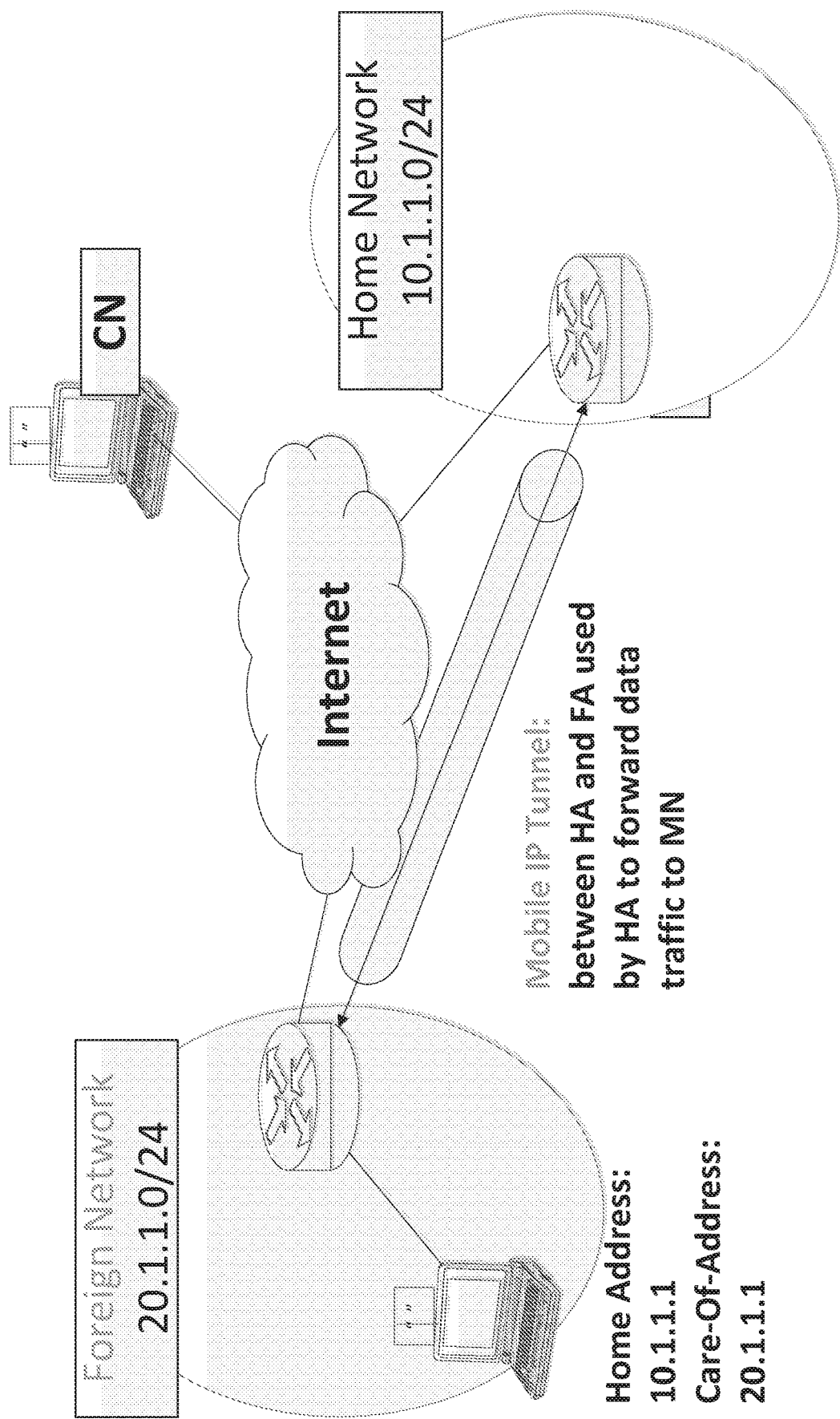
FIG. 3 illustrates an exemplary mobile internet protocol operation.

MIP provides client based mobility management as illustrated in FIG. 3. It enables global reachability and session continuity by introducing the Home Agent (HA), an entity located at the Home Network of the Mobile Node (MN) which anchors the permanent IP address used by the MN, called the Home Address (HoA). The HA is in charge of proxying on behalf of the MN's HoA when the MN is not at home, and redirecting received traffic to the MN's current location. When away from its home network, the MN acquires a temporary IP address from the visited network—called CareofAddress (CoA)—and informs the HA about its current location by sending a Binding Update (BU) message. An IP bi-directional tunnel between the MN and the HA is then used to redirect traffic from and to the MN. There is also optional support for a Foreign Agent (FA) which is a router on a MN's visited network that provides routing services to a registered MN. The FA de-tunnels and delivers to the MN datagrams that were tunneled by the MN's home agent. For datagrams sent by a MN, the FA may serve as a default router for registered MNs. In addition MIP also supports enabling the MN to directly exchange traffic with its communication peers—called Correspondent Nodes (CNs)—without traversing the HA. This additional support is called Route Optimization (RO), and allows the MN to also inform a CN about its current location.

MIP provides client based mobility management, where the mobile node is aware of its own mobility and takes an active part in the mobility management. While the Proxy Mobile IPv6 introduced in next section is a network based mobility management protocol. This means the mobility is transparent for the mobile node, which does not involve in the mobility management and signaling. The network entity performs these functionalities on its behalf.

Proxy Mobile IP (PMIP)

Proxy Mobile IPv6 (PMIPv6) was standardized to provide network-based IP mobility management to a MN, without requiring the participation of the MN in any IP mobility-related signaling. The mobility entities in the network track the movements of the MN, initiate the mobility signaling, and set up the required routing state.

The network is responsible for managing IP mobility on behalf of the MN. The mobility entities in the network are responsible for tracking the movements of the MN and initiating the required mobility signaling on its behalf.

The major mobility management entities of PMIPv6 are the MAG and the LMA. In addition, configuration and security sever(s) are often present, e.g., AAA server. A MAG performs mobility-related signaling on behalf of the MNs attached to its access links. A MAG is the access router for the MN; that is, the first-hop router in the localized mobility management infrastructure. An authentication, authorization, and accounting (AAA) server can be used by a MAG to obtain profile information for the PMIP domain and the MN during configuration as well as dynamically on-the-fly as needed.

LMA is the home agent for an MN in a PMIPv6 domain. It is the topological anchor point for MN home network prefixes and manages the binding state of an MN. A LMA has the functional capabilities of a home agent as defined in Mobile IPv6 base specification along with the capabilities required for supporting the PMIPv6 protocol.

A MN is an IP host whose mobility is managed by the network. A MN can be an IPv4-only node, IPv6-only node, or a dual-stack node, which is a node with IPv4 and IPv6 protocol stacks. A MN is not required to participate in any IP mobility-related signaling for achieving mobility for an IP address or for a prefix that is obtained in the PMIP domain.

Network Mobility (NEMO)

The NEMO protocol was introduced to enable a mobile network of nodes to move together and attach to different points in the Internet. For example, this includes moving vehicles such as ships, trains, or airplanes that may host a network of nodes. The protocol is an extension of mobile IPv6 and allows session continuity for every node in the mobile network as the network moves. It also allows every node in the mobile network to be reachable while moving around. Because MIP handles mobility per host, it is not efficient when handling such mobility scenarios.

NEMO introduces a new entity called a mobile router. The mobile router, which connects the network to the Internet, runs the NEMO basic support protocol with its HA. Every mobile network has at least one mobile router. A mobile router is similar to a mobile node in MIP, but instead of having a single HoA, it has one or more IP prefixes as the identifier. After establishing a bidirectional tunnel with the HA, the mobile router distributes its mobile network's prefixes through the tunnel to the HA. The HA in turn announces the reachability to the mobile prefix. Packets to and from the mobile network flow through the bidirectional tunnel between the mobile router and the HA to their destinations. Note that mobility is transparent to the nodes in the moving network. Hence the NEMO protocol is designed so that network mobility is transparent to the nodes inside the mobile network.

Distributed Mobility Management (DMM)

The DMM paradigm aims at minimizing the impact of currently standardized mobility management solutions, which are centralized. Centralized mobility solutions, such as Mobile IPv6 or the different macro-level mobility management solutions of 3GPP EPS, base their operation on the existence of a central entity, e.g., HA, LMA, PGW or GGSN, that anchors the IP address used by the mobile node and is in charge of coordinating the mobility management. This central anchor point is in charge of tracking the location of the mobile and redirecting its traffic towards its current topological location. While this way of addressing mobility management has been fully developed by the Mobile IP protocol family and its many extensions, there are also several limitations that have been identified. Among them, include longer (sub-optimal) routing paths, scalability problems, signaling overhead (and most likely a longer associated handover latency), more complex network deployment, higher vulnerability due to the existence of a potential single point of failure, and lack of granularity on the mobility management service, i.e., mobility is offered on a per-node basis, not being possible to define finer granularity policies, as for example per-application, and reliability.

DMM, is currently being worked on by the IETF DMM working group. DMM aims to distribute the mobility anchor to the access network level to avoid the centralized mobility anchor problem. By distributing the mobility anchor, the traffic can be distributed in an optimal way.

DMM tries to overcome the limitations of traditional centralized mobility management, by bringing the mobility anchor closer to the MN. In doing so, the data paths tend to be shorter and the overall architecture is inherently more scalable. In addition, the mobility management tasks are distributed and shared among several network entities, which therefore do not need to be as powerful as for the centralized alternative.

Figure 4A:
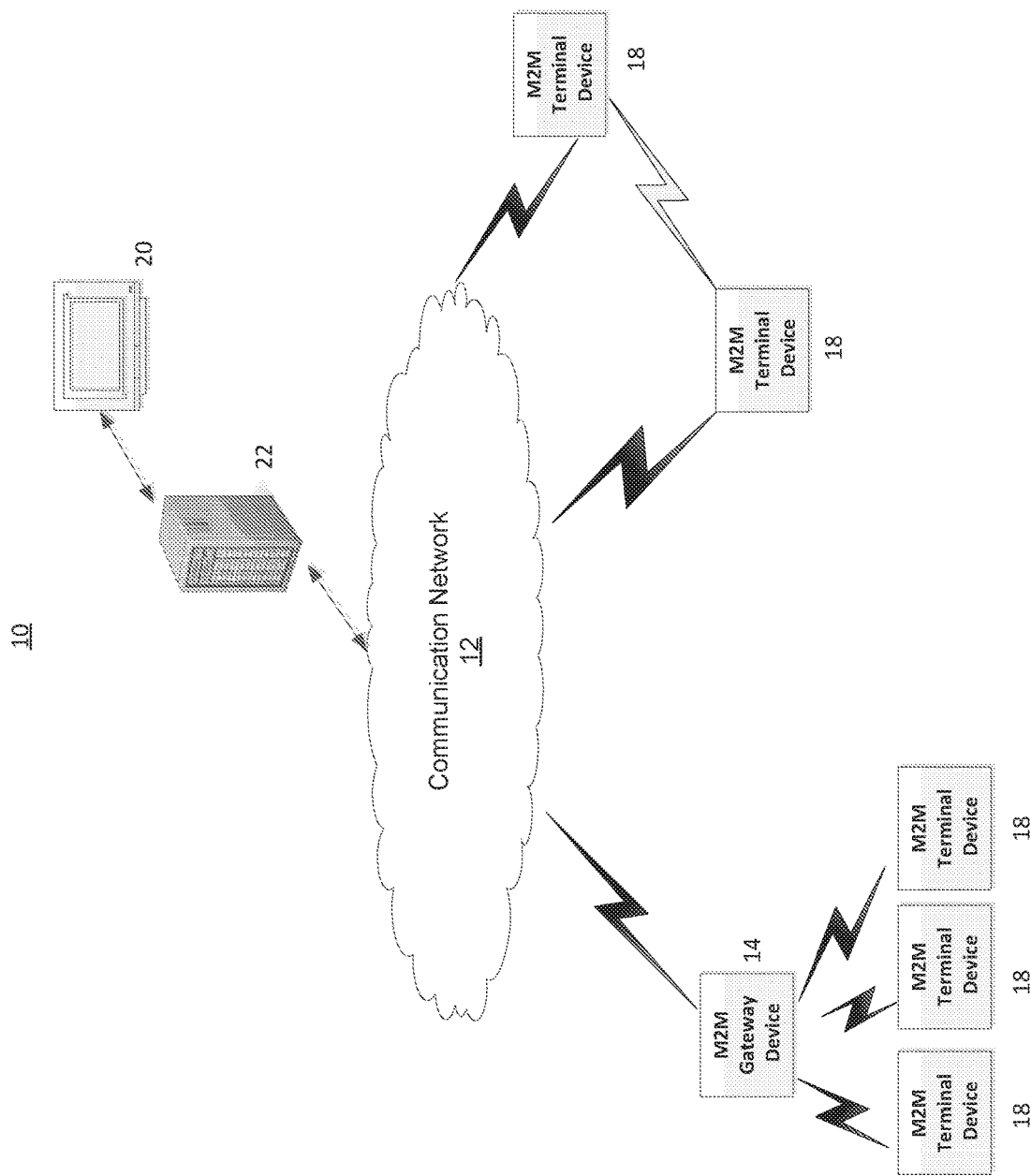
FIG. 4A illustrates an embodiment of a machine-to machine (M2M) or IoT communication system.

Note that the ND protocol is responsible for managing the IP address configuration to guarantee the uniqueness of the address, while these IP mobility protocols update the address mapping and/or tunneling at different entities, in order to maintain the IP connection. In other words, ND protocol and IP mobility protocols serve different purposes at different stages. General Architecture FIG. 4A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 4A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a satellite network, a home network, or an enterprise network for example. Any of the client, proxy, or server devices illustrated in any of FIGS. 1, 3, 4A-4D, 7, 10-11 and 13 may comprise a node of a communication system FIGS. 1, 3, 4A-4D, 7, 10-11 and 13.

The service layer may be a functional layer within network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 4A the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 4B:
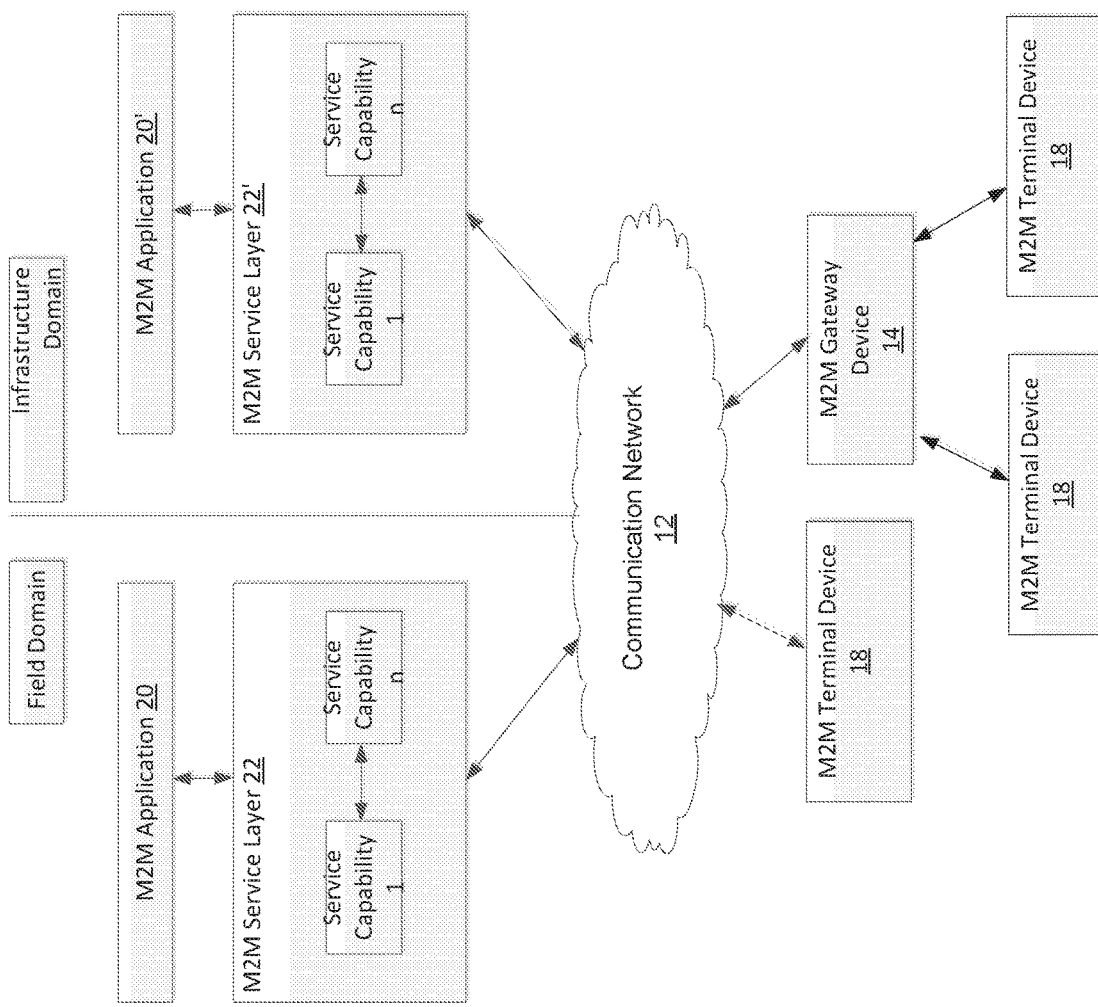
FIG. 4B illustrates an embodiment of the application of a M2M service platform.

Referring to FIG. 4B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 4B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'. Moreover, the M2M service layer may also be configured to interface with other devices such as UEs, SCSs and MMES as discussed in this application and illustrated in the figures.

Generally, a Service Layer, such as the Service Layers 22 and 22' illustrated in FIG. 4B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined architecture for machine-type communications (MTC). In that architecture, the Service Layer, and the service capabilities it provides, is implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIGS. 4C and 4D described below.

Figure 4C:
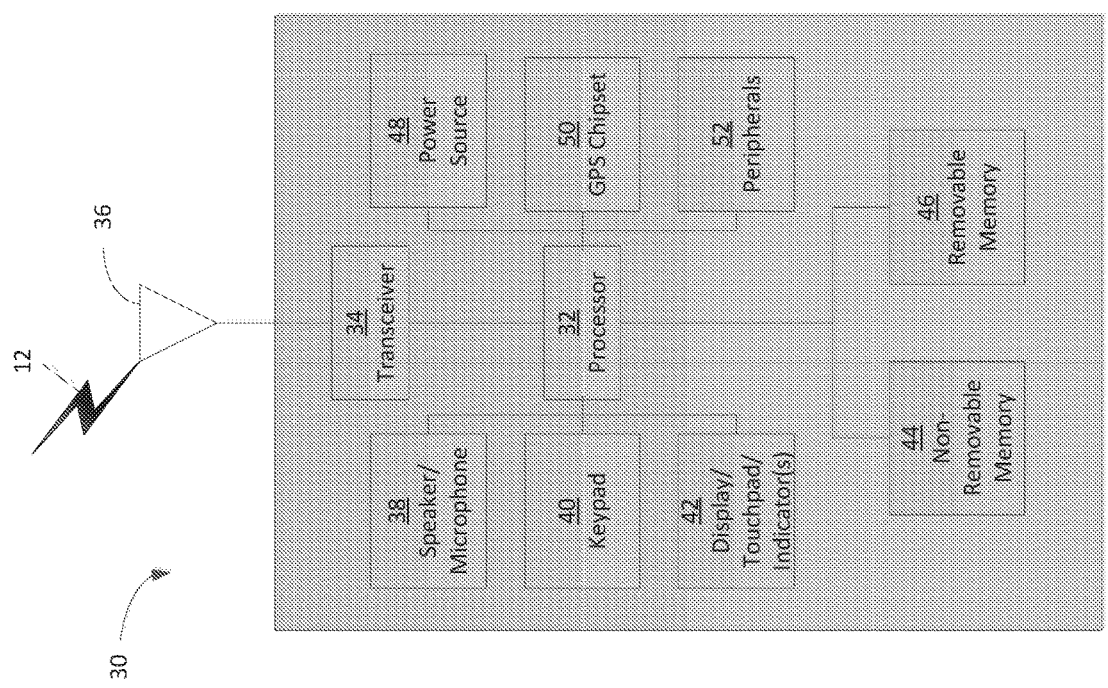
FIG. 4C illustrates an embodiment of the application of a system diagram of an example M2M device.

FIG. 4C is a block diagram of an example hardware/software architecture of a node of a network, such as one of the clients, servers, or proxies illustrated in FIGS. 1, 3, 4A-4D, 7, 10-11 and 13, which may operate as an M2M server, gateway, device, or other node in an M2M network such as that illustrated in FIGS. 1, 3, 4A-4D, 7, 10-11 and 13. As shown in FIG. 4C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The display may include a graphical user interface as illustrated in FIG. 15. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements methods for supporting mobility among routers, e.g., in relation to the methods described in reference to FIGS. 5A-B, 6, 8-9, 12, 14, Tables 2-7, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 4C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the methods of supporting mobility among routers} herein, e.g., in relation to FIGS. 5A-B, 6, 8-9, 12, 14, Tables 2-7, or in a claim. While FIG. 4C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 3 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 4D:
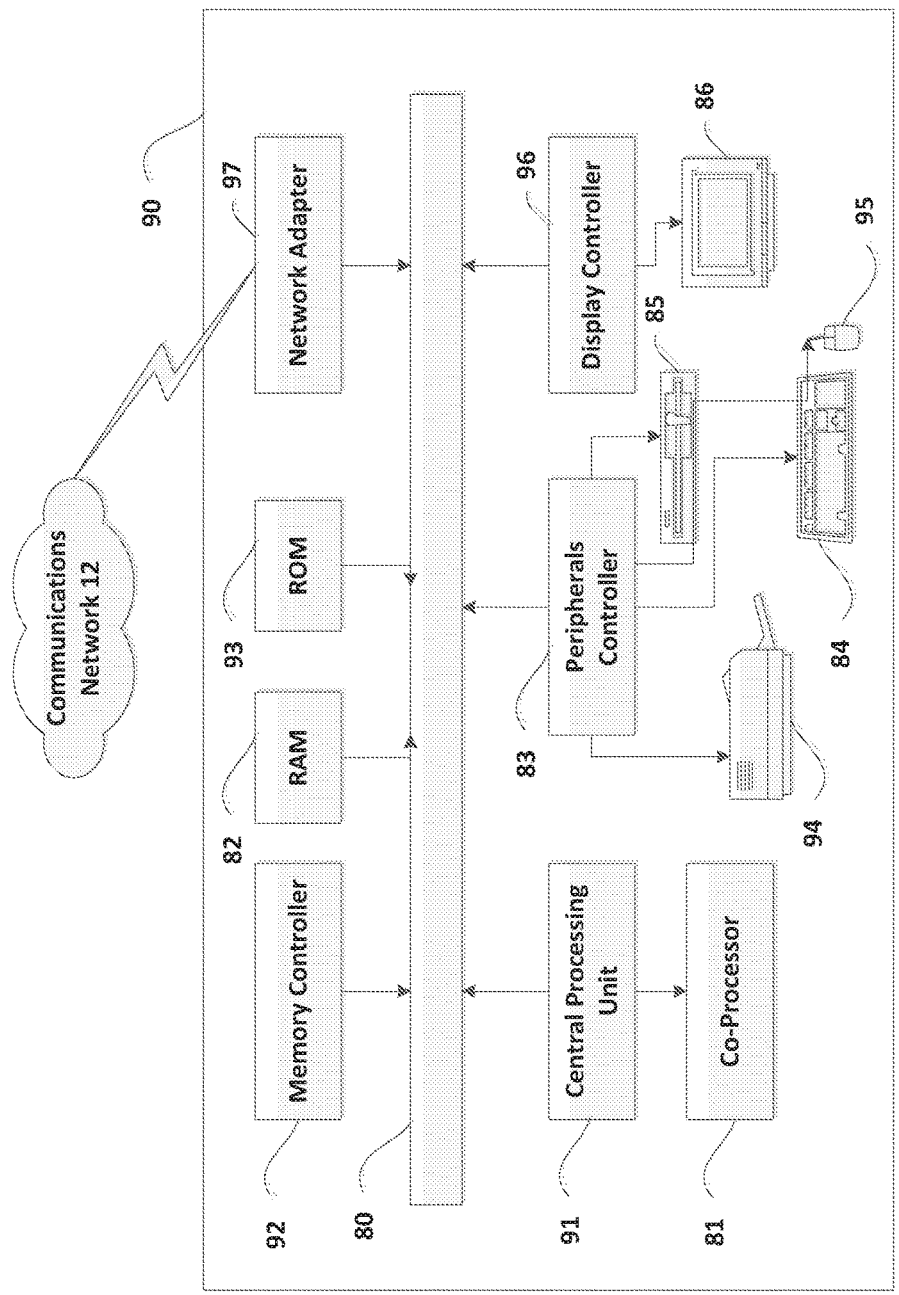
FIG. 4D illustrates an embodiment of the application of a block diagram of an exemplary computing system.

FIG. 4D is a block diagram of an exemplary computing system 90 which may also be used to implement one or more nodes of a network, such as clients, servers or proxies illustrated in FIGS. 1, 3, 4A-4D, 7, 10-11 and 13, which may operate as an M2M server, gateway, device, or other node in an M2M network such as that illustrated in FIGS. 1, 3, 4A-4D, 7, 10-11 and 13.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 4-D, to enable the computing system 90 to communicate with other nodes of the network.

Support for Address Registration and DAD with Mobility

Due to the mobility within a 6LoWPAN, a moving 6LN/6LR may need to register its address with multiple 6LRs/6LBRs at different times. To reduce the overhead of these repeated address registration processes for the same address, new mechanisms and new parameters are proposed to help differentiate the new address to register from an address that has already been registered before through other 6LR/6LBR within the 6LoWPAN. For those addresses that have been successfully registered before, the address registration will be simplified (without DAD process). Specifically, the 6LR which receives the NS, will create a NCE and won't initiate DAD process since the address is registered with registration lifetime.

According to an aspect of the application, values of an existing 'status' parameter in ARO are included in the NS message. Currently, 'status' in the NS message has to be set to 0 or will be ignored with any other values. The new value of 'status' in the NS may indicate if the address to register is a new address or if the address has already been successfully registered, i.e., NS message aims to initiate a new address registration process with DAD or only trigger a re-registration process. Certain security measures, e.g., message authentication, could be provided in order that the 6LR is able to verify the authenticity and integrity of the NS message and that the message was sent by the right entity, e.g., 6LN. For example, a message authentication tag could be used, which may contain a digital signature or a message authentication code that is generated by the 6LN using symmetric or asymmetric cryptographic mechanisms. It is assumed that the 6LR is pre-provisioned with the appropriate credentials associated with the 6LN in order that the 6LR is able to verify the authentication tag:

Alternatively, this could be done by defining a new parameter 'sequenceNumber' to indicate the number of times that an address has been registered/re-registered. The 6LN is responsible for maintaining and updating the sequence number associated with an address. Initially, 'sequenceNumber' is set to 0 in NS when 6LN is trying to register a new address. Later on, 6LN sends out a NS for re-registering the address, it needs to increase the sequence number by 1.6LR will also keep track of the sequence number associated with an address in NCE. 6LR will update the sequence number associated with an address only when the sequence number of an address in NS is larger than that in NCE, e.g., the NS is a fresh address registration message.

Based on the value of 'status' or 'sequenceNumber', ARO is extended by defining new a parameter 'lifeTimeExtension' to indicate if the host (i.e., 6LN) wants to extend the registration lifetime for a registered address when the host initiates a re-registration process. This new parameter is valid for re-registering an address. In other words, this new parameter will be ignored if the host wants to register a new address.

For re-using 'status' parameter of ARO in NS message, an example of possible values is provided below in Table 2. The status is meaningful only if the value is either 0 or 1. NS will otherwise be ignored.

TABLE 2

| Status Value | Description |
| --- | --- |
| 0 | Address is a newly configured address requiring registration. |
| 1 | Address included in ARO is already checked through DAD process, i.e., it is unique during the lifetime within the 6LoWPAN |

There are two possible cases for performing the address registration procedures with the values of status in ARO. In the first case, the status is set to 0. This implies the address has been successfully registered before and is still within its registration lifetime period. The host wants to re-register this address at the same or a different router. In this first case, there is no need to trigger the duplication check. In addition, the DAD process may be skipped. However, the host may want to extend the lifetime of the registered address, so that it could use this unique address for a longer time. To indicate whether the host wants to extend the lifetime of the address, a new 1-bit flag is envisaged. Namely, 'lifeTimeExtension' is 1-bit flag used to indicate if the host would like to extend the lifetime of the address that has been registered. If 'lifeTimeExtension' is set to 1, this implies that host wants to extend the lifetime, and the number supplied in 'Registration Lifetime' field indicates a new lifetime.

Upon receiving the NS, the 6LR should notify the 6LBR to update the registration lifetime. More specifically, the 6LR sends a DAR to 6LBR indicating that this address is already registered, and needs to extend the registration life time.

Separately, a new parameter 'sequenceNumber' could be used as an alternative to re-using 'status' in the NS. Namely, sequenceNumber is set to 0 when a new address is configured for the first time to indicate that the address to register is a new address. The initiator of the NS message will increment the value of 'sequnceNumber' by 1 every time it sends out the NS message with the same, already registered address for re-registration. In other words, the 'sequenceNumber' with a value greater than zero implies a re-registration of an address, and the number of times that the address has been re-registered.

Figure 5A:
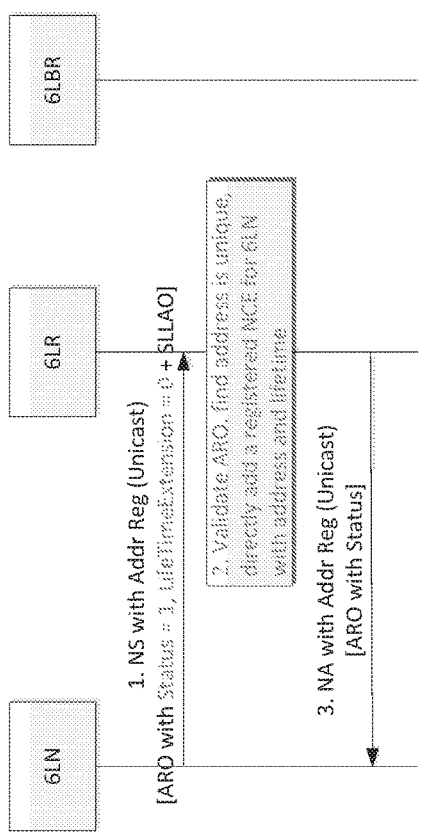
FIG. 5A illustrates a procedure for address registration with a 'status' and 'lifeTimeExtension' in a neighbor solicitation according to an aspect of the application.

According to the second case, when the status is set to 1, the host is configuring a new address that it would like to register. In an embodiment as shown in FIG. 5A, the address registration procedures have a 'status'=1 and 'lifeTimeExtension'=0. The steps are denoted by Arabic numerals. Specifically, in Step 1, the 6LR sends an NS to 6LR to register an address by setting 'status' to 1 and 'lifeTimeExtension' to 0. This implies that the address included in the NS has been successfully registered, and that 6LN would like to initiate a re-registration process. In addition, 6LN does not want to extend the original registration lifetime because is it set to 0.

One or more reasons may be employed for triggering this re-registration process. One reason is mobility. Namely, the 6LN moves in range of a new 6LR within a 6LoWPAN. Therefore, the 6LN needs to register with the new 6LR for the same address. Another reason is to re-establish the connection. Namely, the link between 6LN and 6LR is disconnected due to poor link quality and interference, and is recovered, so the 6LN needs to re-register the same address with the 6LR.

Before sending out the NS, the 6LN needs to determine if the 6LR is in the old 6LoWPAN, or in a new 6LoWPAN. If the 6LN finds out that it is in a new 6LoWPAN, the 6LN will configure a new address, and set status=0 to follow legacy address registration process. In this embodiment, it is assumed the 6LR is in the old 6LoWPAN and therefore 6LN sends out a NS for re-registration.

Next in Step 2, the 6LR checks the value of 'status' and 'lifeTimeExtension' and finds out that the address has been successfully registered and will be unique during the registration lifetime. 6LR will create a NCE storing the address and other registration information, e.g., link layer address or registration lifetime, of the 6LN if this address was not previously registered at this 6LR. Alternatively, the 6LR will update the existing NCE if information in the NCE does not align with information in the NS. It is not necessary to perform DAD as the address is guaranteed unique within the registration lifetime. Subsequently, the 6LR returns the NA with status=0 and ARO (Step 3).

Figure 5B:
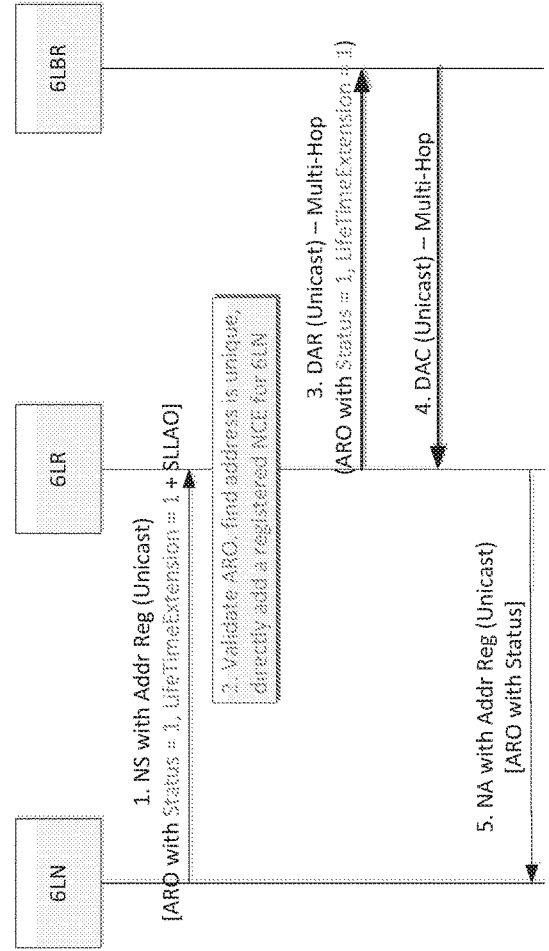
FIG. 5B illustrates another procedure for address registration with a 'status' and 'lifeTimeExtension' in a neighbor solicitation according to an aspect of the application.

According to another embodiment as shown in FIG. 5B, an address registration procedure is described with 'status'=1 and 'lifeTimeExtension'=1. Each of the steps is denoted by an Arabic numeral. In Step 1, 6LN sends out a NS to re-register an address and would like to extend the registration lifetime by setting 'lifeTimeExtension' to 1. In Step 2, the 6LR checks the value of 'status' and 'lifeTime-Extension' and decides to contact 6LBR to extend the registration lifetime.

In Steps 3 and 4, the 6LR sends DAR with values of 'status' and 'lifeTimeExtension' flag to 6LBR. 6LBR will update the registration life time of the existing NCE for the address. The uniqueness of the address is guaranteed since the original registration lifetime has not expired. If the lifetime expires, the value of the 'status' is set to 1. This indicates the address should be treated as a new address. According to Step 4, the 6LR returns a NA message to 6LN with 'status'=0 and ARO.

Figure 6:
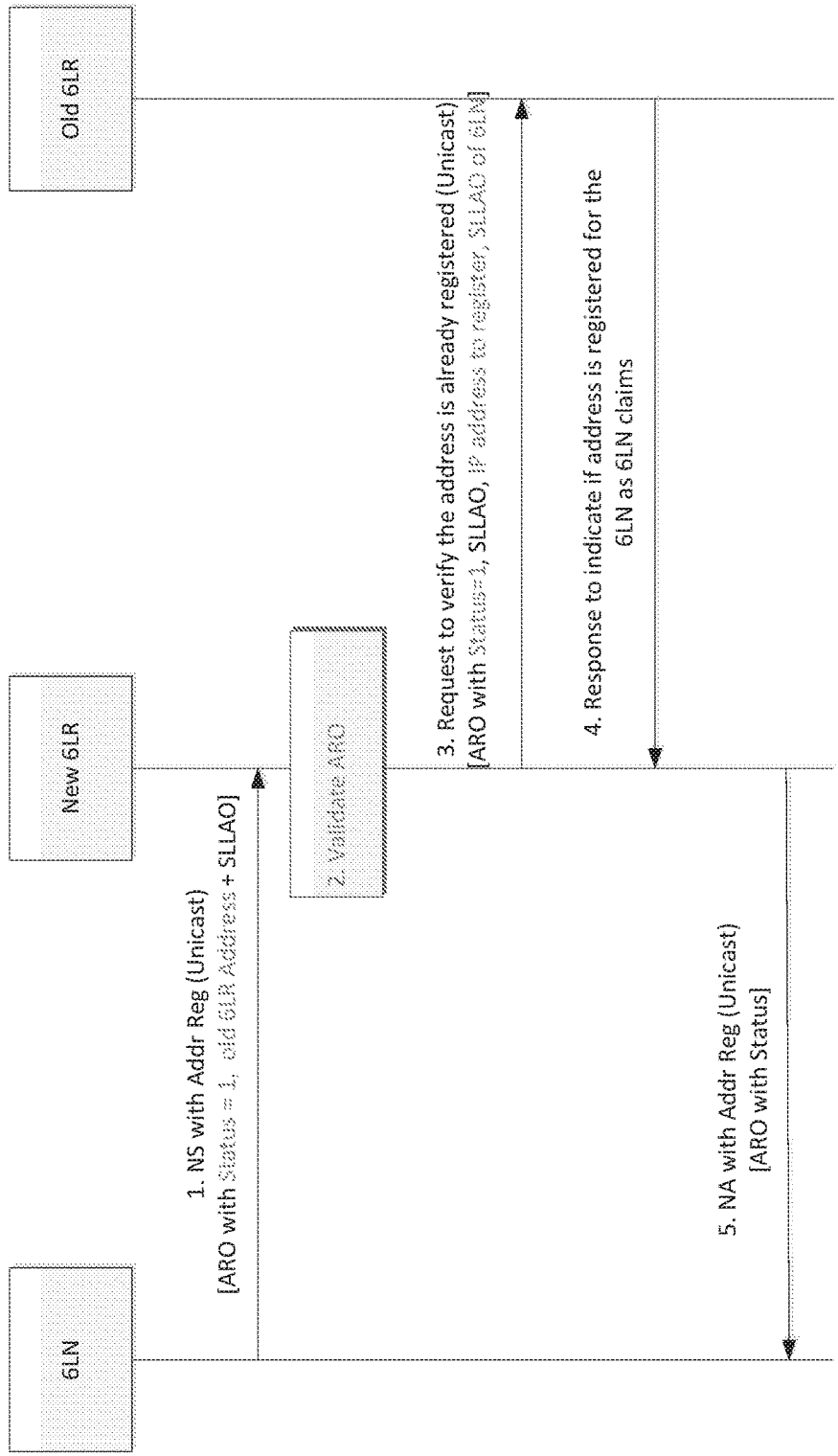
FIG. 6 an address registration and verification protocol at an old router for an already-registered address according to an aspect of the application.

According to another embodiment, it is possible that 6LR or 6LBR may reject the "extension" request if the 6LN violates certain policy and/or if the maximum number of times the re-registration process is exceeded beyond a threshold. To prevent the case that a 6LN comes in and registers an address by intentionally indicating the address has already been registered, even though it has not, the 6LN may be required to provide the information about the old 6LR which originally registered the address. The new piece of information could be inserted in the ARO when a 6LN starts the address registration and claims that the address has already been registered. With such information, the new 6LR is able to communicate with the old 6LR to double check if the address is already been registered as 6LR claimed. FIG. 6 illustrates the procedure involving the old 6LR verifying the address is already registered for 6LN as it indicated. This is optional for the new 6LR and there may be multi-hop communications between the new 6LR and the old 6LR. According to Step 1, the 6LN sends a NS with the address registration. This includes the ARO with a 'status'=1, the old 6LR address, and the SLLAO. The new 6LR validates the ARO in Step 2. In Step 3, the new 6LR requests the old 6LR to verify the address is already registered as specified by the 6LN. The old 6LR sends a response confirming or denying the veracity of the 6LN's NS to the new 6LR (Step 4). Further, the new 6LR forwards the NA with the address registration, including the ARO with status, to the 6LN.

Figure 7:
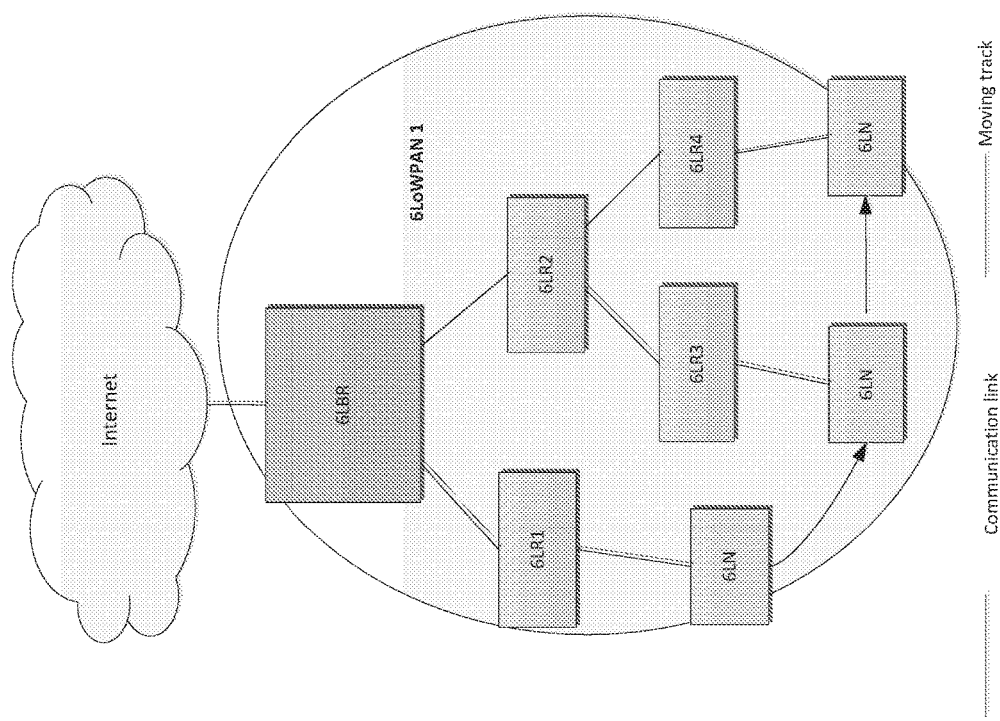
FIG. 7 illustrates an architecture having mobility within a 6LoWPAN according to FIGS. 5A, 5B, 6 and 7.
Figure 8:
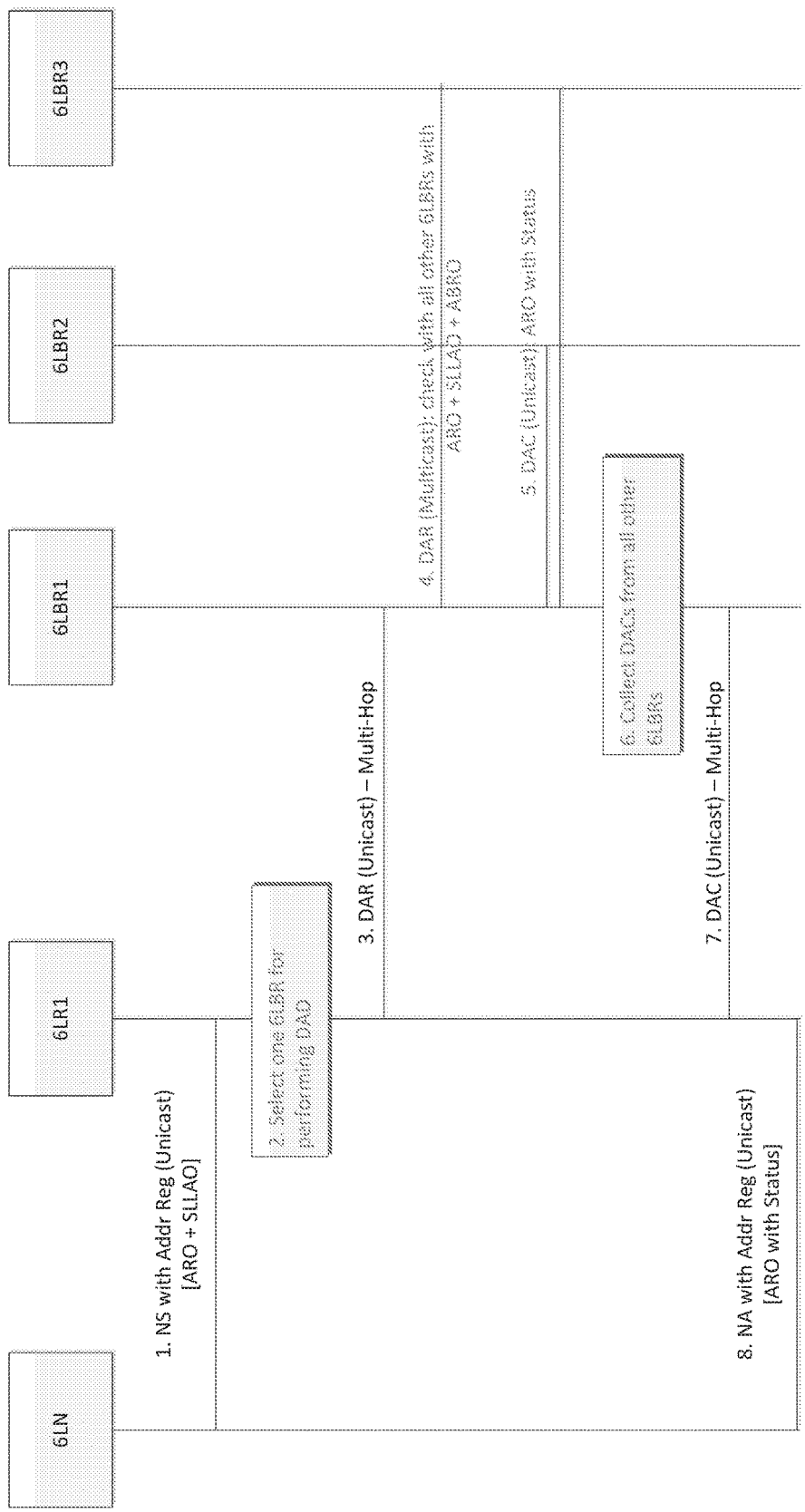
FIG. 8 illustrates an address registration with duplicate address detection (DAD) with coordination among multiple border routers according to an aspect of the application.

FIG. 7 illustrates a use case where an air quality sensor, i.e., 6LN, is moving within a 6LoWPAN, to collect data, and report/publish its measured data to the Internet. Accordingly, the air quality sensor will change its point of attachment from a first, to a second, and a subsequent router, i.e., from 6LR1 to 6LR3 to 6LR4. According to the application, the address registered for the sensor should remain static because it is moving within the 6LoWPAN.

Support for Address Registration and DAD with Multiple 6LBRs

According to another aspect of the application, protocols and architecture are provided to support address registration and DAD with multiple 6LBRs. It is assumed that all the 6LBRs are configured with the same prefix, context information and context ID (CIDs). Interactions among 6LBRs are introduced to coordinate DAD for registering an address. This is necessary since a 6LBR may not know all the registered addresses maintained by other 6LBRs. To ensure an address is truly unique within the 6LoWPAN, the 6LBR needs to coordinate with all other 6LBRs in the same 6LoWPAN for purposes of DAD.

In one embodiment, a 6LBR to multicasts DAR to each 6LBR in the 6LoWPAN for a duplication check when it receives a DAR from 6LR or a NS from a 6LN. This is shown, by example, in FIG. 8. According to Step 1, 6LN sends a NS message to 6LR1 for registering an address. Next, the 6LR1 receives the NS message, and selects a 6LBR for triggering DAD process assuming 6LR1 knows multiple 6LBRs (Step 2). They 6LR1 may not know that there are multiple 6LBRs in the 6LoWPAN. However, the 6LR1 may know at least one 6LBR. In the case that 6LR1 knows multiple 6LBRs, and it needs to select only one 6LBR, the selected 6LBR is responsible for coordinating the duplicate check among all the other 6LBRs. To select the 6LBR, 6LR1 may employ one or more of the criteria: (i) select the 6LBR that is in the default router list of 6LR1; (ii) select the 6LBR that is closest to 6LR1; (iii) select the 6LBR that is known for 6LR1 and stays the highest in the 6LoWPAN tree topology if 6LBRs form a hierarchical structure; (iv) select the 6LBR that is pre-configured as the coordinator for DAD when multiple 6LBRs exist in one 6LoWPAN.

Next in Step 3, the 6LR1 forwards the DAR to the selected 6LBR1. Thereafter, upon receiving the DAR message, 6LBR1 sends the DAR message to other 6LBRs via multicast (Step 4). The DAR sent from 6LBR1 should include ABRO to indicate the information about the sender 6LBR. This information could be used by other 6LBRs to reply the DAR message.

According to Step 5, each individual 6LBR sends a DAC as a response of the DAR to the 6LBR1. The DAC indicates if the address is a duplicate based on the DAD table maintained by each 6LBR. In Step 6, the 6LBR1 collects DAC from all other 6LBRs. The 6LBR1 determines if the address is a duplicate based on its own DAD table and responses from other 6LBRs. In Steps 7 and 8, the 6LBR1 sends a DAC to 6LR1. In turn, the 6LR1 sends a NA with a corresponding ARO with a status to the 6LN.

Figure 9:
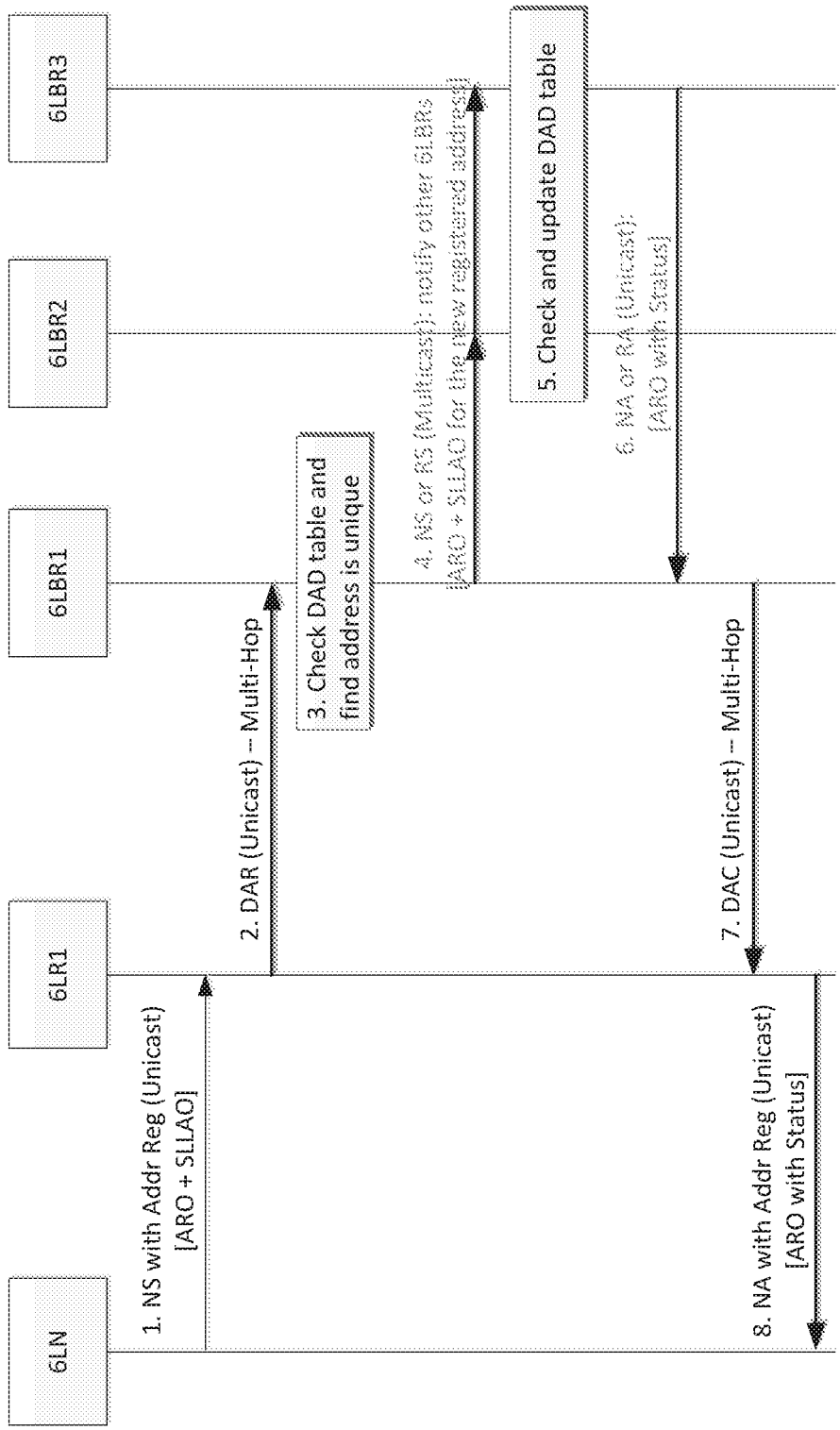
FIG. 9 illustrates an address registration with duplicate address detection (DAD) with coordination among multiple border routers according to another aspect of the application.

According to another embodiment, as shown by example in FIG. 9, each 6LBR is not required to check the DAD table. Each 6LBR maintains a DAD table with all of the up-to-date addresses that are successfully registered within the 6LoWPAN. This is regardless of which 6LBR approves the registration. Each 6LBR notifies other 6LBRs when it successfully registers a new address. In so doing, the 6LBR will not be required to forward DAR to other 6LBRs for duplication check.

As shown in Step 1, a NS message, including an address registration (ARO and SLLA) is received by 6LR1 from a 6LN. In turn, the 6LR1 sends a DAR message in unicast transmitted to a 6LRBR1 for address registration and DAD process (Step 2). The DAR message may include multiple hops. 6LBR1 checks its DAD table (Step 3). It is assumed that the address is not a duplicate otherwise the 6LBR1 will immediately return the NA indicating a duplicate address without any further interaction with other 6LBRs.

According to Step 4, once the 6LBR1 determines the address is not a duplicate, 6LBR1 multicasts a notification to all other 6LBRs using NS or RS message. Subsequently, all other 6LBRs will create a new NCE with corresponding information in their DAD table (Step 5).

While the address should be unique if 6LBR1 indicates so, it is necessary for other 6LBRs to check the DAD table to prevent the concurrent registration process for the same address at a different 6LBR. Namely, the possibility still exists for two devices attempting to configure and register the same address at different 6LBRs around the same time. This could be called registration conflict when there are multiple 6LBRs in a PAN. Optionally, any 6LBR except 6LBR1 can send back a NA or RA message to 6LBR1 if it finds a registration conflict (Step 6).

6LBR1 will wait for a while to see if there are any registration conflicts. For example, 6LBR1 may set up a timer for registration conflict. If the timer expires and no other 6LBR replies for registration conflict, then 6LBR1 will create a NCE. In Steps 7 and 8, the 6LBR1 sends a DAC to 6LR1, which then sends a NA with a corresponding ARO with status to 6LN.

According to the embodiments described above in regards to FIGS. 8 and 9, the 6LBRs are all assumed to have an equal role for managing the 6LoWPAN. It is also possible that 6LBRs forms a hierarchical structure, i.e., the top tier 6LBR manages the second tier 6LBR, etc.

Figure 10:
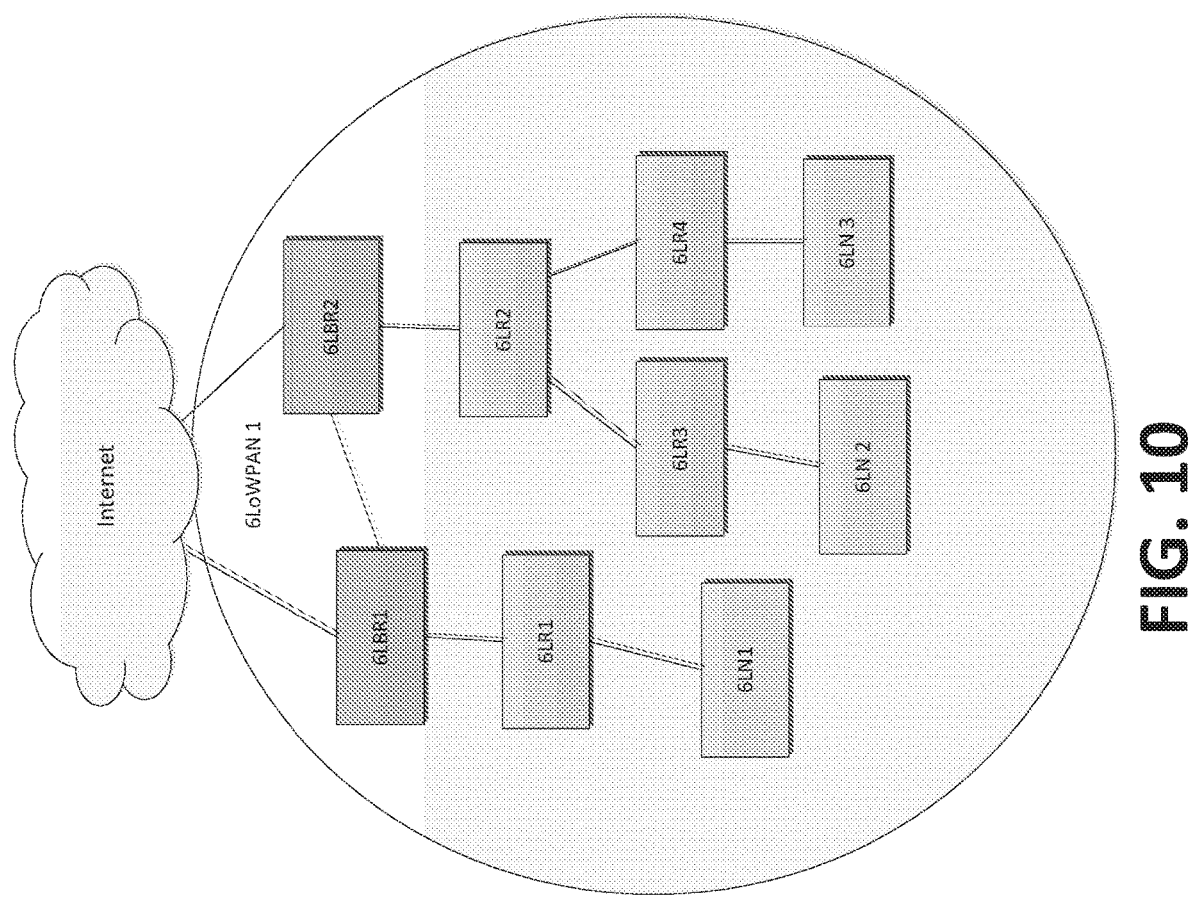
FIG. 10 illustrates an architecture having mobility of border routers within a 6LoWPAN according to FIGS. 8 and 9.

According to another embodiment, a use case is illustrated in FIG. 10 wherein multiple 6LBRs are present in a 6LoWPAN. Deploying multiple 6LBRs in a 6LoWPAN may be beneficial for allowing traffic load to be balanced within the network. Routing paths may also be optimized.

Support for Address Registration and DAD with Network Mobility across Multiple 6LoWPANs According to yet even another aspect, protocols and architectures are described for supporting address registration and DAD with network mobility across multiple 6LoW-PANs. These protocols are invoked when 6LR and several 6LNs move as a network or group and keep a static/stationary relationship with respect to each other. As a result, it is not necessary to require a host to initiate procedures such as router discovery and address registration. There may be multiple ways for the 6LR to differentiate if it is moving only itself or those 6LNs are moving together. One way is configuration during the first registration. Another way is through a NS/NA message exchange. 6LR could broadcast/multicast an NA when it moves into a new 6LoWPAN, and based on the response, it could send out one DAR with new addresses configured for all the 6LNs that are associated with the 6LR in the old 6LoWPAN.

Figure 11:
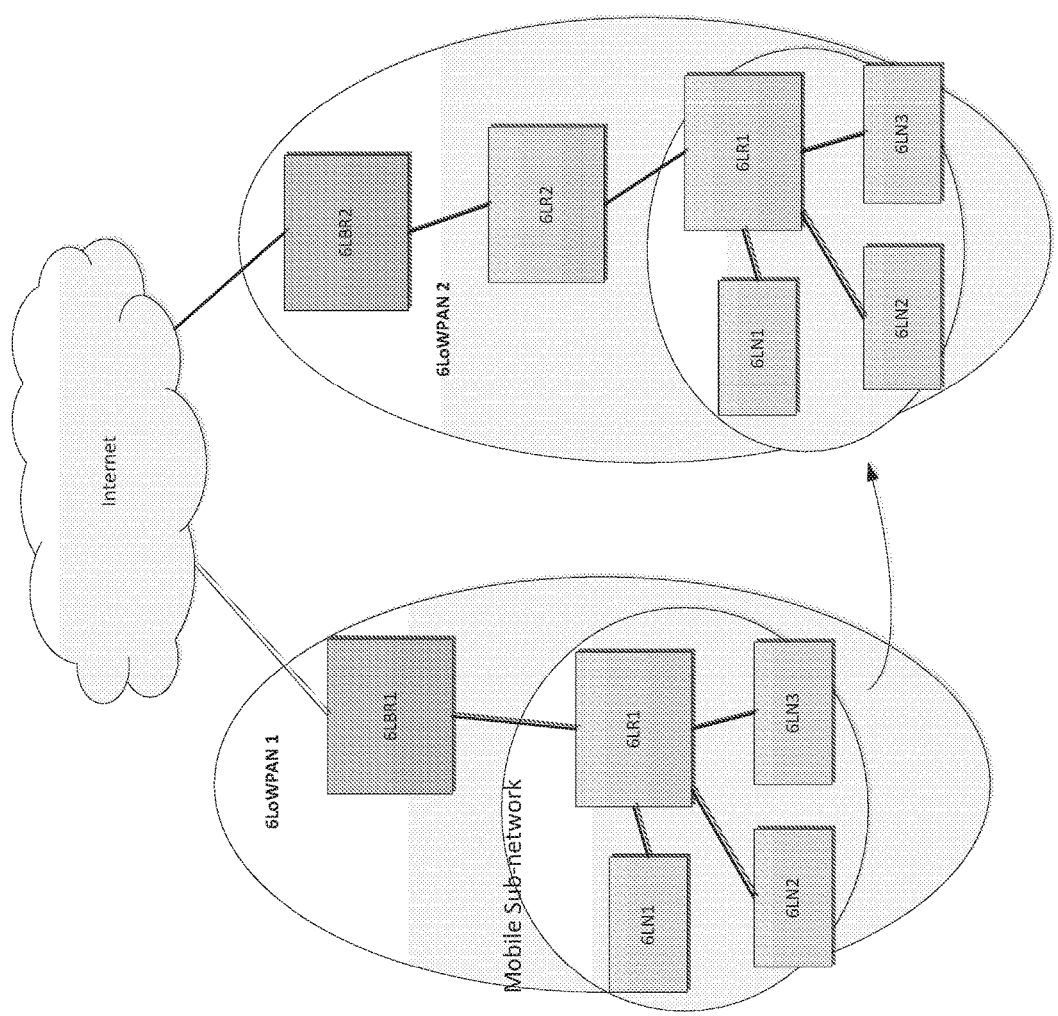
FIG. 11 illustrates an architecture having network mobility across multiple 6LoWPANs according to an aspect of the application.

In regards to FIG. 11, for a more efficient address registration procedure in 6LoWPAN2, the 6LR could initiate the address registration process for those 6LNs that are moving with 6LR as a group/network to the 6LoWPAN2. Since those 6LNs are already registered with the 6LR when they were in the old 6LoWPAN, 6LR knows their link layer identifications, e.g., MAC address, EUI-64, and the 6LR may configure the new addresses for those 6LNs in the new 6LoWPAN.

As a result, communication traffic between individual 6LNs and the 6LR can be minimized. Namely, each 6LN does not need to send NS message to a 6LR with an ARO to register a new address in the new PAN. Instead, the 6LR can configure the address for each 6LN that is moving along with it, based on the link layer identification it already has from the 6LN, and the prefix information of the new PAN. This could also reduce the possibility that two or more 6LNs configure and register the same address to be used in the new PAN.

This may be envisaged in FIG. 11 where several devices in a 6LoWPAN move together as a group cross multiple 6LoWPANs. For example, a vehicle, i.e., 6LR1, moves around to collect various types of data by carrying different types of sensors, i.e., 6LNs. The vehicle moves across multiple 6LoWPANs. Each 6LoWPAN employs different sets of prefixes and contexts. The sensors carried by the vehicle are relatively stationary, with respect to the vehicle, even though they are moving across 6LoWPANs. Hence, these devices (sensors and vehicle) could be considered one virtual-device. This moving virtual device includes multiple devices each of which will change the IP address and use different contexts when moving into a new 6LoWPAN. It is assumed that these sensors and routers use IEEE 802.15.4 and/or similar link-layer technologies, which provide short MAC addresses, as the underlying technology and use 16-bit short MAC address to reduce message size and communication overhead. As a result, multi-hop DAD is supposed to be performed to detect duplicate addresses.

Figure 12:
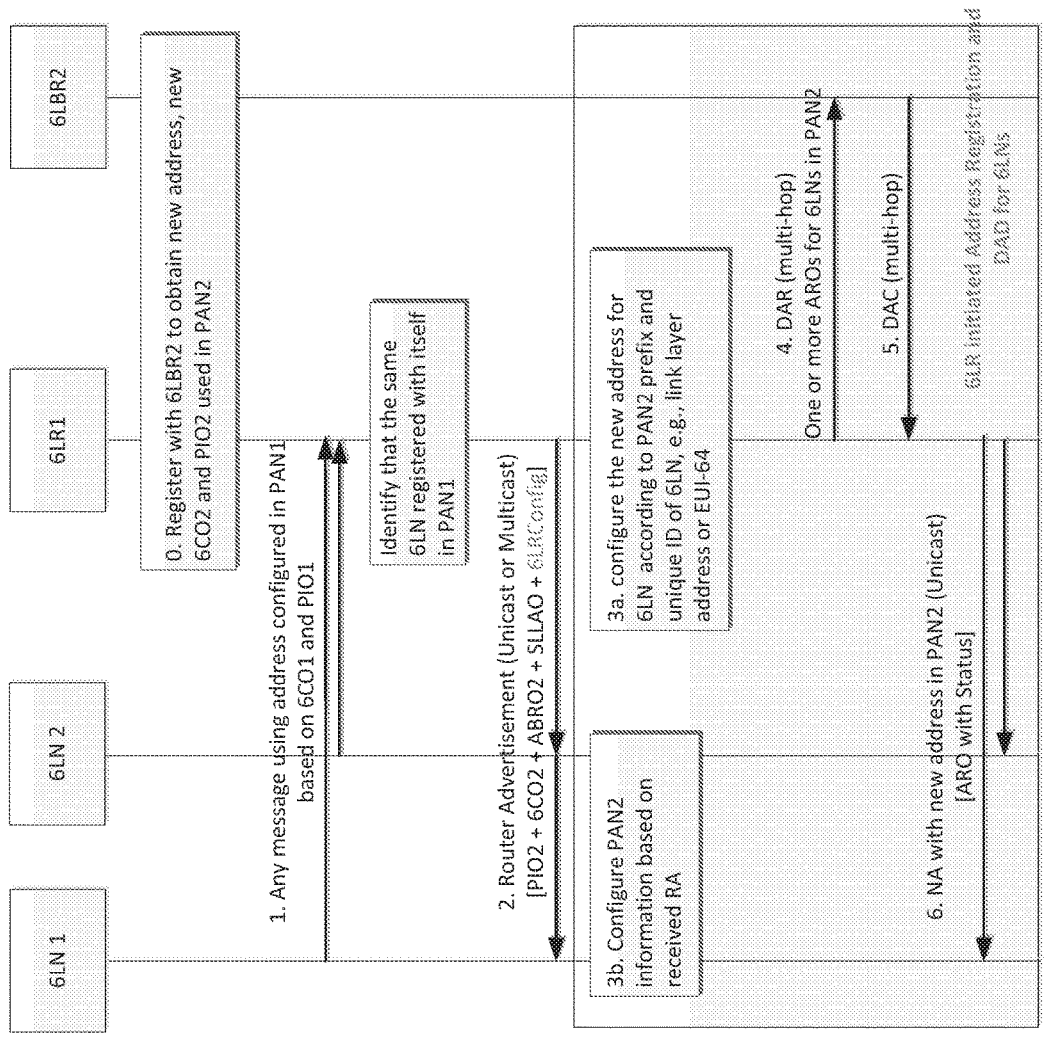
FIG. 12 illustrates a router initiated address registration for network mobility across 6LoWPANs according to an aspect of the application.

According to an embodiment as shown in FIG. 12, an exemplary procedure is described for address registration and DAD initiated by 6LR when 6LNs move with the 6LR into 6LoWPAN2 based. Each of the steps is denoted by an Arabic numeral. Step 0 is a pre-configured step assuming 6LR1 completes the router discovery and address registration process in the 6LoWPAN2 (new network). In addition, 6LR1 will obtain the PIO2 and 6CO2 that are used in the 6LoWPAN2.

In Step 1, any message, e.g., NS, RS or data packet, from 6LN1 or 6LN2 to 6LR1 will trigger the address configuration at 6LR1. This is optional as 6LR1 may multicast RA for advertising the router information and information of 6LoW-PAN2 before 6LNs start communicating with it. Alternatively, the 6LR1 may multicast a RA immediately after it finds out that it moves into a new 6LoWPAN. This is to notify 6LNs that their associated 6LR has been in a new 6LoWPAN.

Next, 6LR1 determines that the same 6LN(s) that registered with it is sending messages using the address and context configured in the old 6LoWPAN (Step 2). One way to configure the address is to look up the NCEs that are established in 6LoWPAN1, and configure the new address based on the link layer address of those 6LNs. 6LR1 will update NCEs once it is confirmed that those 6LNs keep associated with the 6LR1 and the addresses are unique through DAD. 6LR1 multicasts a RA message with the information of the new 6LoWPAN. In the RA message, 6LR1 inserts a new 1-bit flag. The information may include a 6LRConfig which is a 1-bit flag to indicate if the 6LR1 wants to configure the address for those 6LNs/6LRs that keep the same registration relation as they do in the 6LoW-PAN1. If 6LRConfig is set, 6LNs/6LRs receiving the RA will skip the NS message, and wait for NA with the configured address.

Subsequently, after sending the RA to advertise the prefix and context information of the new 6LoWPAN, 6LR1 configures the IP addresses for those devices based on their link layer addresses (Step 3a). This is possible since 6LR1 knows the link layer addresses of those 6LNs when they register in the 6LoWPAN1. In addition, doing so may reduce the probability that those 6LNs configures the same address for registration in the 6LoWPAN2. Alternatively, upon receiving the RA from 6LR1 in Step 2, the 6LNs update the prefix and context information as well as border router information of the 6LoWPAN2 (Step 3b). Since the 6LRConfig flag is set, those 6LNs/6LRs will wait for NA containing ARO with the address used in the 6LoWPAN2.

According to Steps 4 and 5 following Step 3a, the 6LR1 initiates the DAD by sending DAR message, which may contain multiple AROs. Each ARO is configured for one device that remains registered with 6LR1 in the new 6LoW-PAN. DAC is returned to 6LR1 indicating if addresses are duplicated for each device. These two steps are performed when the 16-bit short MAC address is used to configure the IP address, i.e., they are optional. Next, 6LR1 sends NA to individual device via unicast if the configured address is unique (Step 6). If any address configured in Step 3a is a duplicate, Steps 3a, 4 and 5 will be repeated.

Alternatively, those 6LNs could wait until they receive the NA message to configure the new IP address as well as information of 6LoWPAN2, i.e., combination of Step 3b and 6 at 6LN. The NS message is saved for address registration in the scenario of the network mobility across two 6LoW-PANs. In addition, DAD is done once for all the devices that remain associated with the same router in the new PAN. Thus, more efficient address registration and DAD is achieved.

According to this embodiment, it is assumed that short MAC address is used in both 6LoWPANs, and short address is assigned by one-hop direct 6LR/6LBR, implying that the short address may not unique within the a 6LoWPAN. In addition, the IP address is configured based on prefix and short address. Therefore, DAD is required to guarantee that short MAC address used in an IP address is unique. In this sense, the 6LR is assigned with a new short address by 6LBR2 and new IP address in the 6LoWPAN2 during step 0.

6LNs associated with 6LR may reach the 6LR using the old short address and IP address of 6LoWPAN1 depends upon certain factors. One factor is whether the 6LR broadcasts a MAC layer beacon before Step 1. Then the 6LNs may reach the 6LR during Step 1 by extracting a new short address of 6LR. It will then identify the 6LR with the new short address actually is the 6LR which they were associated with in 6LoWPAN1. Another factor is whether a message received by 6LR during Step 1 will be ignored by 6LR given that the destination address does not match. However, Step 1 still occurs since it is not possible to prevent 6LNs from sending messages to 6LR in reply the NA message, i.e., Step 2. This occurs immediately after the 6LR finds out that the same set or sub-set of 6LNs are associated with itself.

Distributed Address Allocation Scheme

According to another aspect of the application, a distributed address allocation scheme is described. Apart from a centralized address allocation scheme, the distributed address allocation scheme does not require a 6LBR to be involved in every address registration and DAD process. Specifically, 6LBR splits the whole address space into multiple address spaces, each of which will be assigned to a 6LR that is directly associated with the 6LBR. Then the 6LR continues to split its assigned space and assign those sub-spaces to 6LRs that stay under its sub-network. This distributed scheme may help improve scalability and also reduce the overhead of address registration process.

In an embodiment, there are two types of address spaces that may be assigned to a 6LR. The first type is a Dedicated Address Space (DAS). The DAS includes a set of addresses which can only be assigned to 6LRs/6LNs which stay or are present within the sub-network of the 6LR. The second type of address space is a Shared Address Space (SAS). The SAS includes a set of addresses that may be shared among multiple 6LRs. In other words, the addresses within the shared address space may be assigned and used outside the 6LR's network.

Figure 13:
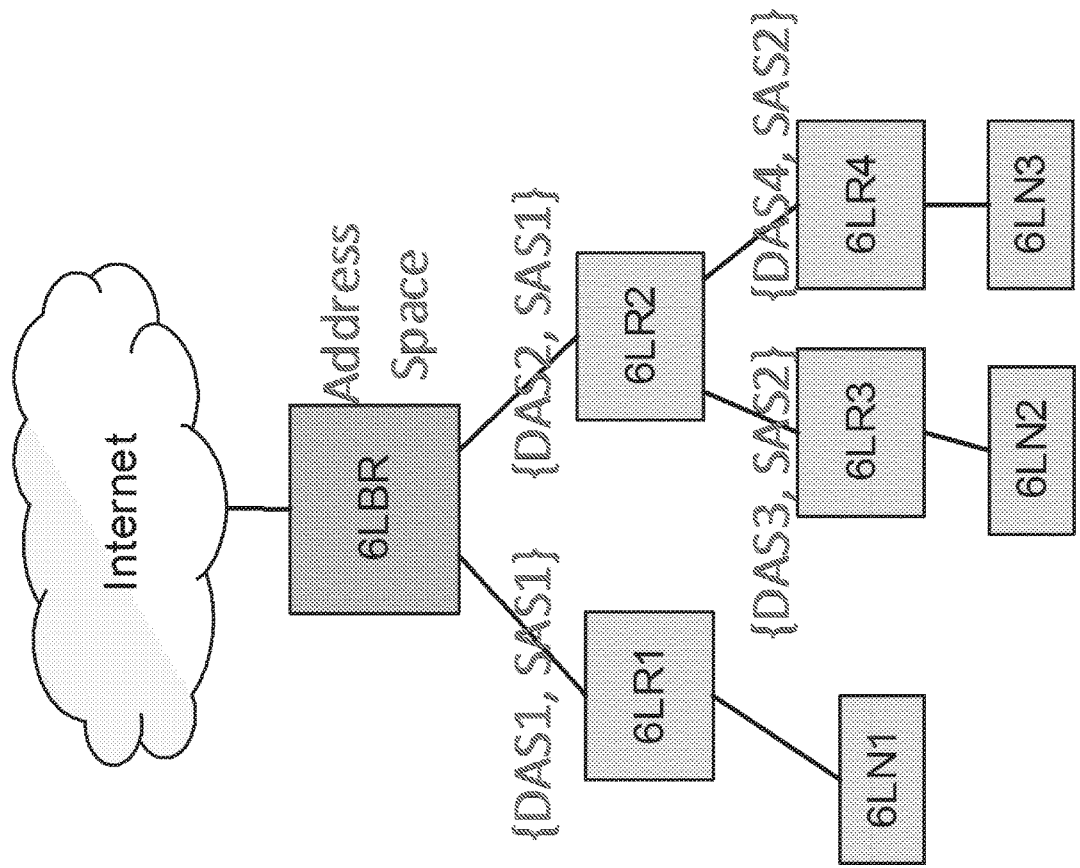
FIG. 13 illustrates a distributed address allocation protocol with address spaces according to an aspect of the application.

According to an embodiment, an address space assignment for the distributed address allocation scheme is exemplary shown in FIG. 13. 6LBR first splits the whole address space, which is generally a dedicated address space since this space is only used within this 6LoWPAN. 6LR2 is assigned with DAS2 and SAS1 after it completes registration with 6LBR. All the addresses in DAS2 can only be allocated to the devices under 6LR2's sub-network, while addresses from SAS1 may be used by devices under 6LR1 as shown in the figure. In addition, 6LR2 assigns {DAS3, SAS2} and {DAS4, SAS2} to 6LR3 and 6LR4 respectively by further splitting its own address space.

According to another embodiment, an address space assignment procedure in regards to a distributed address allocation scheme. First, the address spaces are assigned. In other words, each 6LR will be assigned one or more address spaces when it completes registration with a 6LR or 6LBR. In turn, the 6LR can assign address spaces to other 6LRs that register with it.

A DAS must originate from a DAS to guarantee the uniqueness of the address. Hence, the DAD can be done via a one-hop communication for any address originating from a DAS. Specifically, the DAD is performed via the NS message from the 6LN when 6LN initiates the address registration process. In one embodiment, the address registration process is performed when a SAS is shared throughout the entire PAN. That is, the 6LBR reserves a set of addresses that may be assigned to any device in the PAN. Accordingly, the DAD defined in existing 6LoWPAN NDPs is performed.

In another embodiment, the address registration process is performed when a SAS is shared among several 6LRs associated with the same 6LR or 6LBR. In this case, the parent 6LR/6LBR, which generates this SAS from a DAS, maintains the DAD table to check for duplicates. That is, DAD is performed at the 6LR, which generates this SAS from a DAS. For example, as illustrated in FIG. 13, 6LN2 configures a new address from the SAS2 assigned to 6LR3 by 6LR2. If SAS2 is part of SAS1, then the DAD process regarding the new address will be done at 6LBR. Alternatively, if SAS2 is from DAS2, then 6LR2 could complete the DAD process by checking its DAD table. The implication is that a shared address space could originate from a DAS or a SAS. DAD is therefore completed for an address at the router which assigned the corresponding address space as a DAS for that address regardless of the number of routers sitting between the configuring device and the router. Therefore, a DAD table maintained at each router includes addresses only for the DAS assigned to that router. Although a multi-hop DAD is required for the address originating from a SAS, the DAD is not always terminated at 6LBR. This ultimately reduces the message exchange from/to 6LBR, and distributes the DAD work load throughout the 6LoWPAN.

In an embodiment, each 6LR maintains an address space table including those address spaces assigned to the 6LR. The address space table could be used to determine if the 6LR should check the DAD table for a new address. If the new address falls in a DAS, then this 6LR should check the DAD table to determine if there is any duplicate address. Otherwise, the 6LR needs to forward the address registration message to 6LR or 6LBR it registers with. Alternatively, the address space table could be used to further split the address spaces including DAS and SAS and assign the new spaces to 6LRs that register with it.

Table 3 below lists the formats and the contents in an address space table at 6LR2 based on the embodiment illustrated in FIG. 13. The address spaces are assigned to a 6LR when the 6LR completes its address registration procedure. In other words, the assignment of address space takes place with the address registration process. The address space table is a separate table from the DAD table and NCE. As discussed above, a DAD table is created and maintained to record an individual address that is successfully registered in the 6LoWPAN. 6LR will add addresses that originate from its DAS into its DAD table. NCE is maintained by each 6LR to track the devices that are associated with it. This address space table (AST) records the address prefix(es) assigned to a 6LR. Thus each 6LR will create and maintain an AST.

TABLE 3

| Address Space | Dedicated or Shared | Assigned by Router | Assigned to Router | Valid Duration |
|---|---|---|---|---|
| SAS1 | Shared | 6LBR | NA | {T1, T2} |
| DAS2 | Dedicated | 6LBR | NA | {T1, T2} |
| SAS2 | Shared | NA | 6LR3, 6LR4 | {T1, T2} |
| DAS3 | Dedicated | NA | 6LR3 | {T1, T2} |
| DAS4 | Dedicated | NA | 6LR4 | {T1, T2} |

Figure 14:
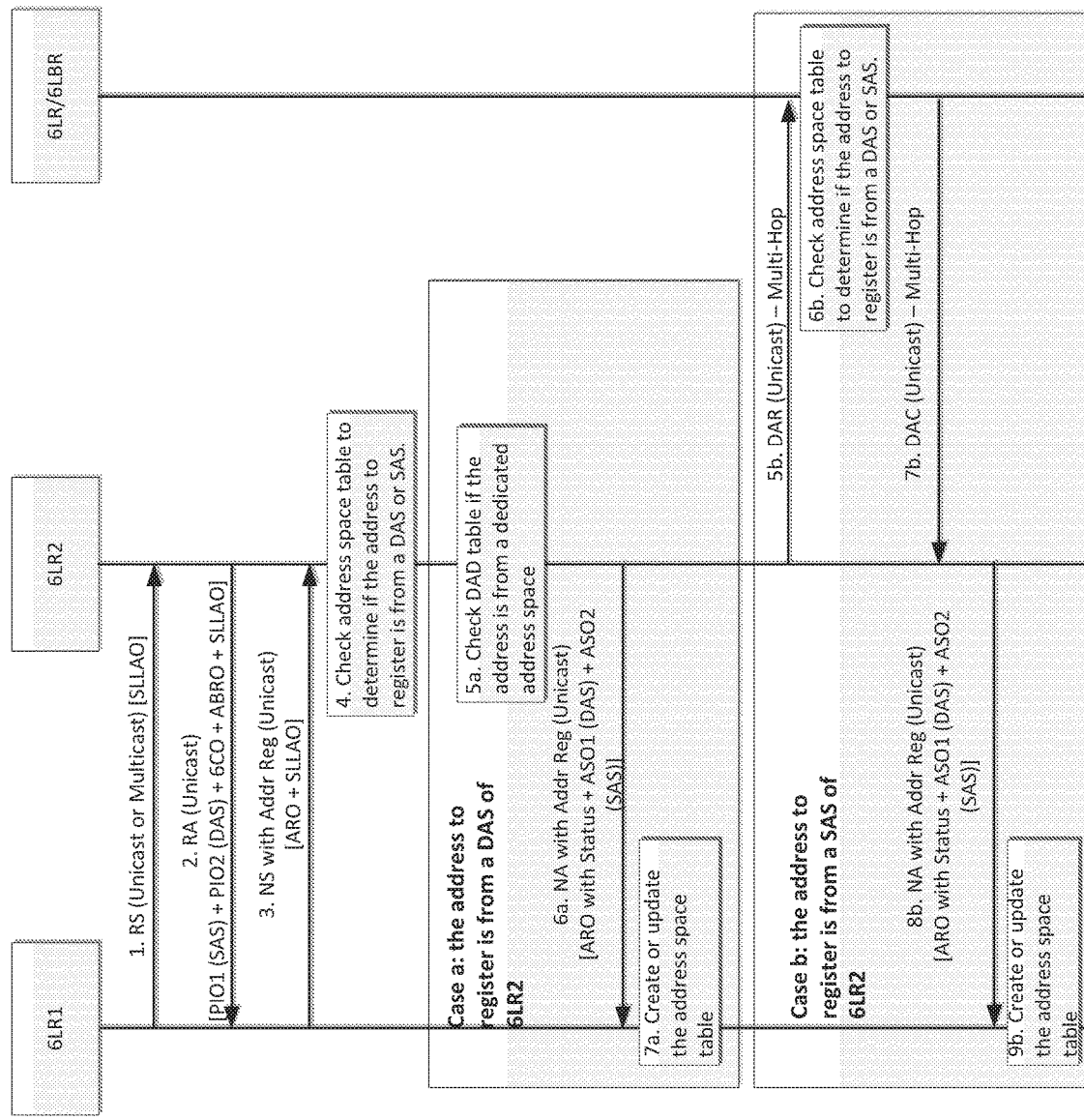
FIG. 14 illustrates an address registration and address space assignment under a distributed address allocation protocol according to yet another aspect of the application.

According to an embodiment, FIG. 14 illustrates a process for address registration and address space assignment under a distributed address allocation scheme. According to Step 1, the 6LR1 initiates a router discovery process by sending out a RS. Next, 6LR2 replies to the RS with a RA message including PIO, 6CO, ABRO and SLLAO (Step 2). The message may include multiple PIOs in the RA, each of which indicates scope of the prefix assigned to 6LR2, i.e., address spaces.

The parameters defined in the PIO include but are not limited to a 1 bit flag D to indicate if an address space (prefix) is shared or dedicated. If D=0, this implies a dedicated address space. Alternatively, D=1 implies a shared address space. The parameters also include a 1 bit flag S to indicate the scope of a shared address space (prefix) whereby S is valid only if D=1. S=0 implies the globally shared prefix throughout the 6LoWPAN. Meanwhile, S=1 implies a locally shared prefix within the sub-network of a 6LR. There could be multiple PIOs in the RA indicating different types of prefix or address space. If 6LR2 knows that its DAS has already been used up by devices under its network, it may not include its DAS in the RA.

According to Step 3, the 6LR1 configures an address based on address spaces in the RA message. The 6LR1 then sends the NS to register a new address. Upon receiving the NS, 6LR2 checks its address space table to determine if the address to register is from a DAS or a SAS.

As shown in FIG. 14, there are two cases which may arise. In the first case—Case a—the address to register is configured from a dedicated address space of 6LR2. In Case a, the new address comes from the dedicated address space allowing 6LR2 to perform DAD (Step 5a). 6LR2 will check its DAD table which maintains all the addresses that are successfully registered for the dedicated address space. Next in Step 6a, 6LR2 returns the NA message with ARO and status. 6LR2 may insert one or more ASOs to assign address space to 6LR1 so that 6LR1 is able to further assign the address and address space within its sub-network. Each ASO represents one address space with information including but not limited to: (i) prefix to represent an address space: a prefix representation covering a set of addresses; (ii) valid duration: indicate the address space is valid during which time period; (iii) a 1 bit flag D to indicate if an address space or prefix is shared or dedicated; and (iv) a 1 bit flag S to indicate the scope of a shared address space or prefix. In an embodiment, 6LR2 will insert ASO only when 6LR1 successfully registers an address. ASO assignment may be performed separately from an address registration process via the NA message. 6LN will not be assigned with any address space. Finally, a 6LR1 updates its address based on ARO, and create the address space table based on ASO(s) in NA message (Step 7a).

In another embodiment—Case b—the address to register is configured from a shared address space of 6LR2. According to Step 5b, the 6LR2 determines the address to register is from one of its shared address space and therefore is unable to determine if the address is a duplicate. 6LR2 sends a DAR to its registered router. The DAR may be forwarded several times, i.e., multiple hops, and is terminated at the first router holding a DAS from which the new address originates. Subsequently, the first router, 6LR/6LBR, checks its DAD table maintaining all registered addresses from the DAS (Step 6b). Then, the DAC is returned to 6LR2 with ARO and status (Step 7b). This may potentially occur via multiple hops. Finally, a NA including an ARO with status is returned to 6LR1 (Step 8), and it creates the address space table based on ASO(s) in the NA message (Step 9). In an embodiment, the address space allocation can take place through RS/RA message exchange.

According to another embodiment, Tables 4, 5, 6 and 7 list parameters in options or messages applicable to a 6LoW-PAN NDP.

TABLE 4

| Parameters | Description |
|---|---|
| lifeTimeExtension | 1-bit flag to indicate if the host would like to extend the lifetime of the address that is included in NS for re-registration |
| sequenceNumber | indicate the number of times that the address has been re-registered |

TABLE 5

| Parameters | Description |
|---|---|
| D flag | A 1 bit flag to indicate if an address space or prefix is shared or dedicated; |
| S flag | A 1 bit flag to indicate the scope of a shared address space or prefix, and S is valid only if flag D indicates it is a shared address space. |

TABLE 6

| Parameters | Description |
|---|---|
| 6LRConfig | 1-bit flag to indicate if the 6LR1 will configure the address for those 6LNs/6LRs that keep the same registration relation as they do in the old 6LoWPAN. |

TABLE 7

| Parameters | Description |
|---|---|
| Address space | Address prefix representing a set of addresses |
| Valid Duration | Indicate the address space is valid during which time period. |
| D flag | A 1 bit flag to indicate if an address space or prefix is shared or dedicated; |
| S flag | A 1 bit flag to indicate the scope of a shared address space or prefix, and S is valid only if flag D indicates it is a shared address space. |

User Interface

According to an embodiment, a graphical user interface for configuring the IPv6 address space that will be assigned to a 6LR is shown in FIG. 15. This graphical user interface may be used to configure an address space table maintained by a router, or configure an ASO sent to other routers. Alternatively, while only one address space is shown in FIG. 15, it is envisaged that multiple address spaces can be configured at a time. The configuration may include the following information:

(i) address space: an address prefix with a set of addresses;
(ii) a dedicated/shared indication: indicate whether the address space is dedicated or shared;
(iii) valid duration: indicate the time period during which the address space is valid;
(iv) scope of shared address space: indicate the address space is shared within which scope, e.g., throughout the entire PAN or under the subnetwork of 6LR which assigns this address space;
(v) assigned by: i indicate this address space is assigned by which router; and
(vi) assigned to: indicate this address space is assigned to which router.

The user interface may be displayed as a registration application on a display, such as for example, a display illustrated in FIG. 4C and FIG. 4D. Users may enter information including but not limited to the information described above on a display of the graphical user interface. A user may select the 'Enable New Configuration' prompt to obtain an address space assignment. Various applications of these networks may also include implementation in sensors, actuators and routers for industrial and office automation, connected homes, agriculture, and smart meters and may be viewed and operated by a user via the GUI.

According to yet another aspect of the application, non-transitory computer-readable or executable storage medium for storing computer-readable or executable instructions is disclosed. The medium may include one or more computer-executable instructions such as disclosed above in the plural call flows according to FIGS. 5A-B, 6, 8, 9, 12 and 14. The computer executable instructions may be executed by a processor, such as the processor disclosed above in FIGS. 4C and 4D employed in devices including 6LNs, 6BRs and 6LBRs.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An apparatus comprising:
a non-transitory memory having instructions stored thereon for assigning address space in a network; and
a processor, operably coupled to the non-transitory memory, configured to execute the instructions of:
receiving a solicitation from a router in the network,
replying to the solicitation with address space,
receiving a second solicitation from the router to register a new address,
determining if the new address is from a dedicated address space or a shared address space, and
sending a neighbor advertisement with the address registration to the router
sending a duplicate address request to a second router for the shared address space; and
receiving a duplicate address confirmation from the second router.

2. The apparatus of claim 1, wherein the processor is further configured to execute the instruction of checking a duplicate address detection table to confirm the address originated from the dedicated address space.

3. The apparatus of claim 2, wherein the neighbor advertisement includes an address space option.

4. The apparatus of claim 3, wherein the address space option permits assignment of the address and the address space within a sub-network.

5. The apparatus of claim 1, wherein the dedicated address space is only assigned when the apparatus is present in a sub-network of the router.

6. The apparatus of claim 1, wherein the dedicated or shared address space includes a 1 bit flag indicating a prefix 'D'.

7. The apparatus of claim 6, wherein D is 0 for the dedicated address space or 1 for the shared address space.

8. The apparatus of claim 6, wherein the shared address space includes a 1 bit flag indicating a scope 'S'.

9. The apparatus of claim 8, wherein S is 0 for a globally shared prefix throughout a network or 1 for a locally shared prefix within a sub-network of a router.

10. The apparatus of 1, wherein the address space includes one or more of a prefix; valid duration, a 1 bit flag D indicating a shared or dedicated address space, and a 1 bit flag S indicating a scope of the shared address space.

* * * * *